(12) United States Patent
Dennis et al.

(10) Patent No.: US 11,803,500 B1
(45) Date of Patent: Oct. 31, 2023

(54) PEER-TO-PEER DC OR AC DISTRIBUTION NETWORK

(71) Applicant: Faith Technologies, Inc., Menasha, WI (US)

(72) Inventors: Kevin Dennis, Waukesha, WI (US); Theodore Peck, Aiea, HI (US); Bradley L. Hansen, Brookfield, WI (US)

(73) Assignee: Faith Technologies, Inc., Menasha, WI (US)

(*) Notice: Subject to any disclaimer, the term of this patent is extended or adjusted under 35 U.S.C. 154(b) by 540 days.

(21) Appl. No.: 16/528,515

(22) Filed: Jul. 31, 2019

Related U.S. Application Data

(60) Provisional application No. 62/712,833, filed on Jul. 31, 2018.

(51) Int. Cl.
*G06F 13/40* (2006.01)
*G06F 13/374* (2006.01)
*G05B 15/02* (2006.01)
*H02J 3/14* (2006.01)

(52) U.S. Cl.
CPC ............ *G06F 13/4027* (2013.01); *G05B 15/02* (2013.01); *G06F 13/374* (2013.01); *H02J 3/144* (2020.01)

(58) Field of Classification Search
CPC .... G06F 13/4027; G05B 15/02; G06F 13/374; H02J 3/14
See application file for complete search history.

(56) References Cited

U.S. PATENT DOCUMENTS

| | | | |
|---|---|---|---|
| 8,008,808 B2 | 8/2011 | Seeker et al. | |
| 9,093,862 B2 | 7/2015 | Dennis et al. | |
| 2004/0098142 A1* | 5/2004 | Warren et al. | F02C 7/275 700/36 |
| 2004/0263116 A1* | 12/2004 | Doruk et al. | F01K 13/00 320/107 |
| 2008/0269953 A1* | 10/2008 | Steels et al. | H02J 7/00036 700/295 |
| 2013/0274947 A1* | 10/2013 | Miller et al. | G06F 1/263 700/297 |
| 2014/0201109 A1* | 7/2014 | Tilley et al. | F24S 30/452 700/297 |
| 2017/0331325 A1* | 11/2017 | Ristau | H02J 3/14 |
| 2017/0358929 A1* | 12/2017 | Koeppe et al. | H02J 3/02 |
| 2019/0288513 A1* | 9/2019 | Nakayama et al. | G06Q 10/04 |
| 2019/0393722 A1* | 12/2019 | Stöcker et al. | H02J 13/0013 |
| 2020/0133220 A1* | 4/2020 | Anichkov et al. | G06Q 40/04 |

FOREIGN PATENT DOCUMENTS

| | | | | |
|---|---|---|---|---|
| EP | 3493360 A1* | 6/2019 | | H02J 7/34 |
| WO | 2016176727 A1* | 11/2016 | | H02J 3/06 |

* cited by examiner

*Primary Examiner* — Phong H Dang
(74) *Attorney, Agent, or Firm* — Boyle Fredrickson, SC

(57) ABSTRACT

A peer-to-peer energy sharing network includes a common bus; a first node including a first local bus electrically connected to the common bus, at least one of a load, a storage device, and a generating capacity electrically connected to the first local bus through a first interface device, and a first local controller in communication with the first interface device; and a second node including a second local bus electrically connected to the common bus, at least one of a load, a storage device, and a generating capacity electrically connected to the second local bus through a second interface device, and a second local controller in communication with the second interface device, wherein the each interface device is controlled by its local controller to selectively pass electrical energy to and/or from the common bus via its local bus.

20 Claims, 8 Drawing Sheets

PEER-TO-PEER DC OR AC DISTRIBUTION NETWORK

BACKGROUND

The present application claims priority to the earlier-filed U.S. Provisional Pat. Application having Serial No. 62/712,833, and hereby incorporates the subject matter of the provisional application in its entirety.

The disclosure hereof relates to the field of energy generation, energy storage, and the use and allocation of electrical energy in an off-grid distribution network, including an off-grid electricity distribution network selectively connectable to a local electric distribution grid. More specifically, disclosed herein are apparatus and methods for generating energy and power, distributing that energy and power, selectively allocating that energy and power, and storing the energy and power over a direct current (DC) or alternating current (AC) bus connected to one or more energy generation devices, one or more energy storage devices, and a plurality of loads, and tracking the generation, storage, and use of the energy or power by one or more user nodes to enable financial settlement as between the node owners, such as the energy generation owners, storage owners, and load owners.

It is known in the art to generate electricity from a variety of renewable sources, such as solar, hydraulic (fluid flow through a turbine), tidal, biomass, Stirling engines, and other sources. The renewable source can be a local source, for example, one or more photovoltaic panels at a location associated with a local use thereof, such as household solar (photovoltaic) panels on a residence or business roof or over a business parking lot, or can be on an industrial scale, for example photovoltaic panel farms, a hydraulic flow resource such as a turbine driven by water flow therethrough, or other such resources. In many cases, the energy generated in the form of electricity is not immediately needed, and is used to offset or replace daytime grid energy requirements at a location such as a residence or business, is sold into the grid, or is stored locally to, or remotely from, the generation location. In each case the local energy generator is dependent upon the utility grid to exchange energy it has generated to, or to receive energy from, the grid when needed. Thus, sharing between local-to-each-other individual users or peers is possible only theoretically through the local utility grid by one entity selling into the grid and the other entity using from the grid. However, the transaction is not between the individual users, but with the utility grid.

Additionally, in many cases, energy in a local storage that has been drawn from the utility grid cannot be sold back into the utility grid, and thus cannot be shared with a local-to-each-other entity or "peer." Thus, collections of individual users or nodes currently on the utility grid, including collections of users, cannot locally share and manage energy or power directly, nor effectively share stored energy or power resources.

SUMMARY

Provided herein are apparatus and methods for a peer-to-peer energy sharing network behind the utility meter, that is, without passing through the local utility grid. The network includes a common bus to which local nodes are electrically connected. Each local node can include a local bus to which at least one of a load, a storage device, and a generating capacity is connected either directly or through one of a converter, a regulator, and an inverter as shown and described in U.S. Pat. No. 9,093,862, which is incorporated herein by reference to the extent it does not conflict herewith.

The present disclosure is directed to a peer-to-peer energy sharing network including a common bus; a first node including a first local bus electrically connected to the common bus, at least one of a load, a storage device, and a generating capacity electrically connected to the first local bus through a first interface device, and a first local controller in communication with the first interface device; and a second node including a second local bus electrically connected to the common bus, at least one of a load, a storage device, and a generating capacity electrically connected to the second local bus through a second interface device, and a second local controller in communication with the second interface device, wherein the first interface device is controlled by the first local controller to selectively pass electrical energy to and/or from the common bus via the first local bus and the second interface device is controlled by the second local controller to selectively pass electrical energy to and/or from the common bus via the second local bus. The energy sharing network can also include a first electric meter interposed in electrical series between the first local bus and the common bus and in communication with the first local controller, and a second electric meter interposed in electrical series between the second local bus and the common bus and in communication with the second local controller. The energy sharing network can further include the first local controller in communication with the second local controller, wherein the first and second local controllers control the first and second interface devices, respectively, based on energy needs negotiated by the first and second controllers.

In another aspect, the present disclosure is directed to a peer-to-peer energy sharing network including a common bus; a first node including a first local bus electrically connected to the common bus, at least one of a load, a storage device, and a generating capacity electrically connected to the first local bus through a first interface device, a first local controller in communication with the first interface device, and a first electric meter interposed in electrical series between the first local bus and the common bus and in communication with the first local controller; and a second node including a second local bus electrically connected to the common bus, at least one of a load, a storage device, and a generating capacity electrically connected to the second local bus through a second interface device, a second local controller in communication with the second interface device, and a second electric meter interposed in electrical series between the second local bus and the common bus and in communication with the second local controller. The first local controller is in communication with the second local controller, wherein the first interface device is controlled by the first local controller to selectively pass electrical energy to and/or from the common bus via the first local bus and the second interface device is controlled by the second local controller to selectively pass electrical energy to and/or from the common bus via the second local bus based on energy needs negotiated by the first and second controllers, and wherein the first controller is configured to compare power and/or energy registered by the first electric meter with the energy needs to set operating conditions for the first interface device.

In still another aspect, the present disclosure is directed to a peer-to-peer energy sharing network including a common bus; a first node including a first local bus electrically connected to the common bus, at least one of a load, a storage device, and a generating capacity electrically connected to the first local bus through a first interface device, and a first local controller in communication with the first interface device; and a second node including a second local bus electrically connected to the common bus, at least one of a load, a storage device, and a generating capacity electrically connected to the second local bus through a second interface device, and a second local controller in communication with the second interface device. The first local controller is configured to automatically or manually negotiate energy needs and prices with the second local controller to determine the amount and cost of power and energy each local node commits to transferring to or from the common bus, wherein the first interface device is controlled by the first local controller to selectively pass electrical energy to and/or from the common bus via the first local bus and the second interface device is controlled by the second local controller to selectively pass electrical energy to and/or from the common bus via the second local bus based on the negotiated commitment, and wherein the local controllers are configured to subsequently reconcile the cost directly or through a third party using money or units.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
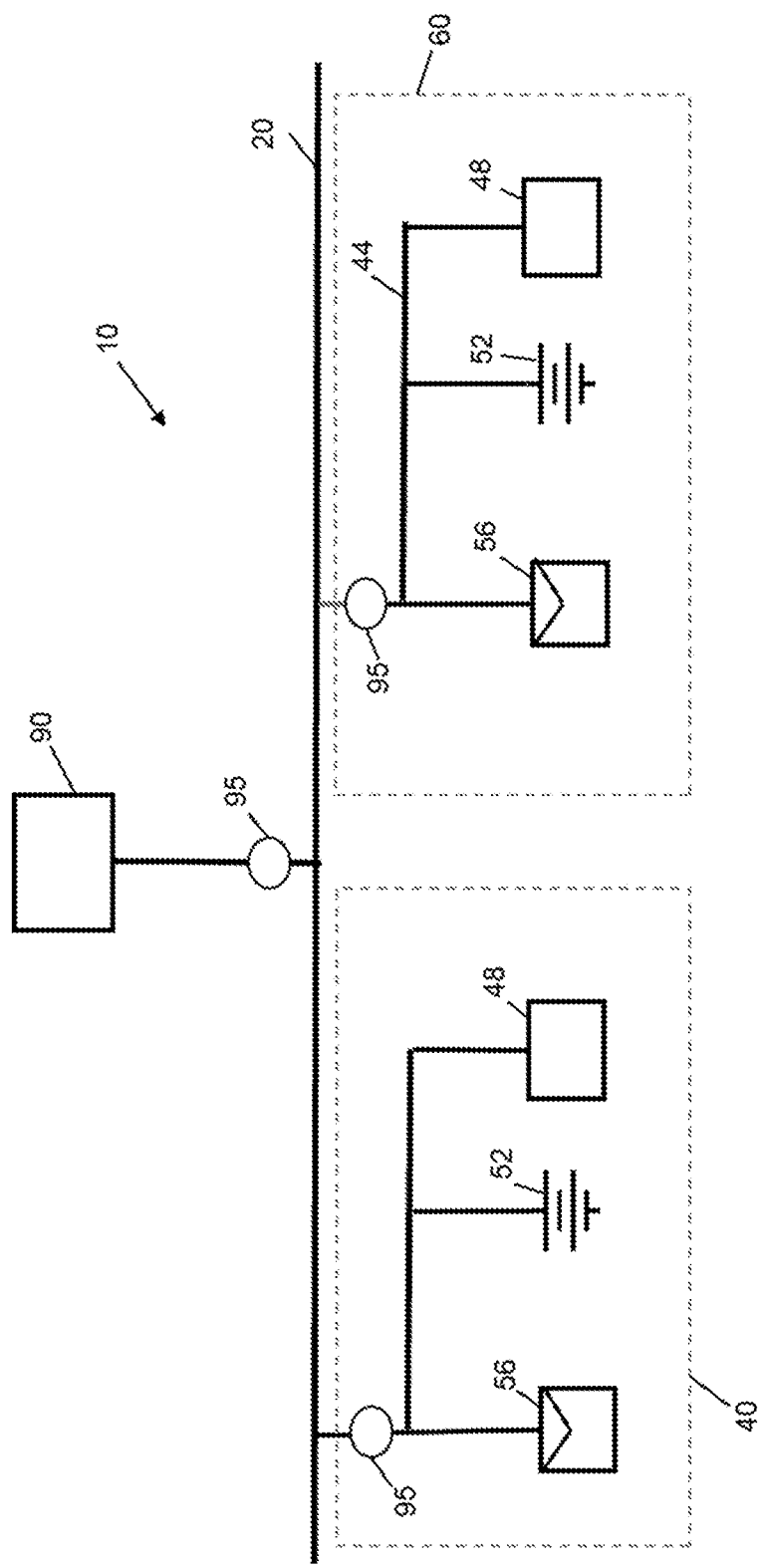
FIG. 1 is a block diagram representation of a hybrid power system employing DC buses according to one aspect of the disclosure.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

As used herein, a "node" is any device or group of devices that act as a single entity connected into a distribution system, and that has the ability to perform at least one of absorbing power/energy (load) from the peer-to-peer distribution network, delivering power/energy (generator) to the peer-to-peer energy network, and both delivering and absorbing energy/power from the peer-to-peer distribution network from time to time.

As used herein, a "local node" is a node that is localized and controlled by the local owner's controller, herein typically, a residence or a commercial or industrial (C&I) site that has a meter between it and the distribution system.

As used herein, a "community node" is a node that is connected to the distribution system and might not be associated with a local node. It can be owned by a third party or by the collection of the local nodes. Typically, it can be a centralized larger distribution system or a set of multiple smaller distribution systems, a collection of individual or groups of energy/power users, energy/power generators, or both with a single or multiple points of connection to a peer-to-peer distribution system.

Unless otherwise noted, "electrically connected" or "connected" means two devices, buses, or other components are in electrical contact such that electrical energy can be made to flow from one to the other. The two can be directly connected or connected through one or more intervening devices, buses, or other components. For example, a device electrically connected to a bus can be either directly connected, connected via a converter, inverter, regulator, or other device, or connected through a switch, for example, such that electrical energy can be made to flow from one to the other when the switch is closed.

Unless otherwise noted, "communication" and its variants mean two devices are in contact through ethernet, wireless, or any other suitable transmission technology such that control signals, data, and other information can be transferred between the devices, either directly or through one or more intervening devices.

A peer-to-peer distribution system 10 is the electrical interconnection to which each of the nodes are interconnected to allow the transfer of energy and power between the nodes. One or more distribution systems can be connected to each node via multiple modular and metered interface points at each node.

The basic elements of the peer-to-peer distribution system 10 are illustrated in FIG. 1. A common or primary bus 20 is electrically connected to a first local node 40 and a second local node 60. Each local node 40, 60 includes a local bus 44 and at least one of a load 48, storage device 52, and generating capacity 56. Each node 40, 60 can include at least two of a load 48, storage device 52, and generating capacity 56 and can include all three as well as multiples of each. Each node 40, 60 can use, generate, and/or store electrical energy for use within that node. Each node 40, 60 can also draw electrical energy from or supply electrical energy to the common bus 20.

The common bus 20 is electrically disposed behind the meter, meaning the common bus 20 is separated from the local utility grid 90 by the utility meter typically used to measure electrical energy supplied by the local utility grid 90. Looking at a utility as a supplier, the common bus 20 is downstream from the utility meter. Behind the meter can also be used to describe the aspect of the present disclosure in which the common bus 20 is not connected to a utility grid 90.

In one aspect, for example, the second local node 60, if deficient in electrical energy, can draw electrical energy from the common bus 20 where such electrical energy is supplied by the first local node 40. In another aspect, the first local bus 40 can draw electrical energy from the common bus 20 where such electrical energy is supplied by the second local node 60. In other aspects, the peer-to-peer distribution system 10 can have any number of local nodes electrically connected to the common bus 20, where each local node operates independently and can have any combination and number of loads 48, storage devices 52, and generating capacities 56. One or more local nodes can also be a separate peer-to-peer distribution system with its own common bus and local nodes such that the overall system includes nested peer-to-peer distribution systems. The peer-to-peer distribution system 10 is expandable to encompass additional local and community nodes as desired.

The peer-to-peer distribution system 10 can optionally include a connection to a utility grid 90 to supply electrical energy to the common bus 20 when the local nodes in total are not supplying sufficient electrical energy to meet demand within the nodes. The peer-to-peer distribution system 10 can also optionally include a community node 100 electrically connected to the common bus 20 (see FIG. 2). The community node 100 includes one or more of a community load 48, community storage 52, and community generating capacity 56. Because these are electrically connected directly to the common bus 20, they are essentially shared by the local nodes.

Each local node 40, 60 and community node 100 is optionally connected to the common bus 20 through an electrical meter 95. In this manner, the power and energy supplied to or drawn from the common bus 20 by each local node 40, 60, community node 100, and grid connection 90 can be measured and accounted for in a transactional system as described below.

The common bus 20 and each local bus 44 can be either an AC or a DC bus. Interconnections between common and local buses 20, 44, between the common bus 20 and a load 48, storage device 52, or generating capacity 56, and between a local bus 44 and its load 48, storage device 52, or generating capacity 56 can include an appropriate interface device 70 to match AC versus DC, voltage levels, or power, phase, and frequency as needed.

The peer-to-peer distribution system 10 is a private electrical network enabling direct power trading behind the utility grid meter for, with the goal of obtaining the lowest cost energy available to a user. The system creates an open market with multiple trading partners connected by one DC link with an optional utility back up to achieve low costs and energy security. The system also allows the users to sell excess electrical energy to the network at high rates and purchase excess from the network at low rates as compared to the utility grid. With the proper protocols in place, residential users can be combined with commercial and industrial users on the same DC link. Multiple sources of back up energy are available at low cost and with full redundancy. Electrical energy sharing can be optimized through manual or automatic peer-to-peer negotiation of rates and energy needs, including consideration of node capacity, load demand, and pricing of multiple independent sources.

One or more peer-to-peer distribution system(s) (DC or AC) are provided behind the utility meter, that is, off of the utility grid, and multiple nodes, where each node can have the ability to generate power/energy into the distribution system, store energy/power, and/or use power/energy from the distribution system, can be connected to each distribution system. Access of a third-party owner of the existing distribution provider, including the local electric utility company, can optionally be connected to the peer-to-peer distribution system, which would include a metered point for energy into and from the peer-to-peer distribution system. Where the peer-to-peer distribution system is a self-supporting micro grid, no connection with an electric utility is optionally established.

Within the peer-to-peer distribution system, peer loads and peer energy providers, for example a photovoltaic source, and peer energy storage are connected at one or more nodes for each user or energy supplier (peer) on the network. A peer can be limited, with respect to the peer-to-peer network, only to use electrical energy from the peer-to-peer distribution system, only to supply energy to the peer-to-peer distribution system, or both use and supply energy with respect to the peer-to-peer distribution system, either directly from an energy source, or from storage of the peer.

Within the peer-to-peer distribution system, in one aspect a centralized monitoring station tracks the drawing of energy/power by a node and the supply of energy/power to the peer-to-peer distribution system at a node based on the timing of use or supply, or based on the assigned value of the energy/power passing into or from the peer-to-peer network, or both, to track energy use and thus for each node, assign a net contribution or net use of energy, and a net value thereof, with respect to the local distribution network over a prescribed period of time. The peer-to-peer distribution system can have assigned rules, which can be changed by the monitoring station, establishing the value of energy therefrom or thereinto at different times. As a result, the net value of energy supplied to each user, or each node, or supplied by each user or each node, can be used to settle in terms of monetary or other compensation between users at the end of a prescribed period.

Additionally, at least one node connecting to the peer-to-peer distribution system includes thereon a local controller, which is user settable to establish whether to take energy from the peer-to-peer network, or supply energy to the peer-to-peer distribution network, based on the nodes need for, or the value of, the energy. The local controller can be autonomous, in communication with the centralized monitoring station, a local controller on other nodes(s), or operate in any two or more of these communication modes at different times.

The system provides isolation from utility grid outage susceptibility but uses the utility grid as a back up to supplement energy needs if required. The system provides protection from utility rate structure changes and reduces vulnerability to utility grid issues such as outages, power surges, and transients. Finally, the system meets all utility grid connection requirements at points of interconnect.

Figure 2:
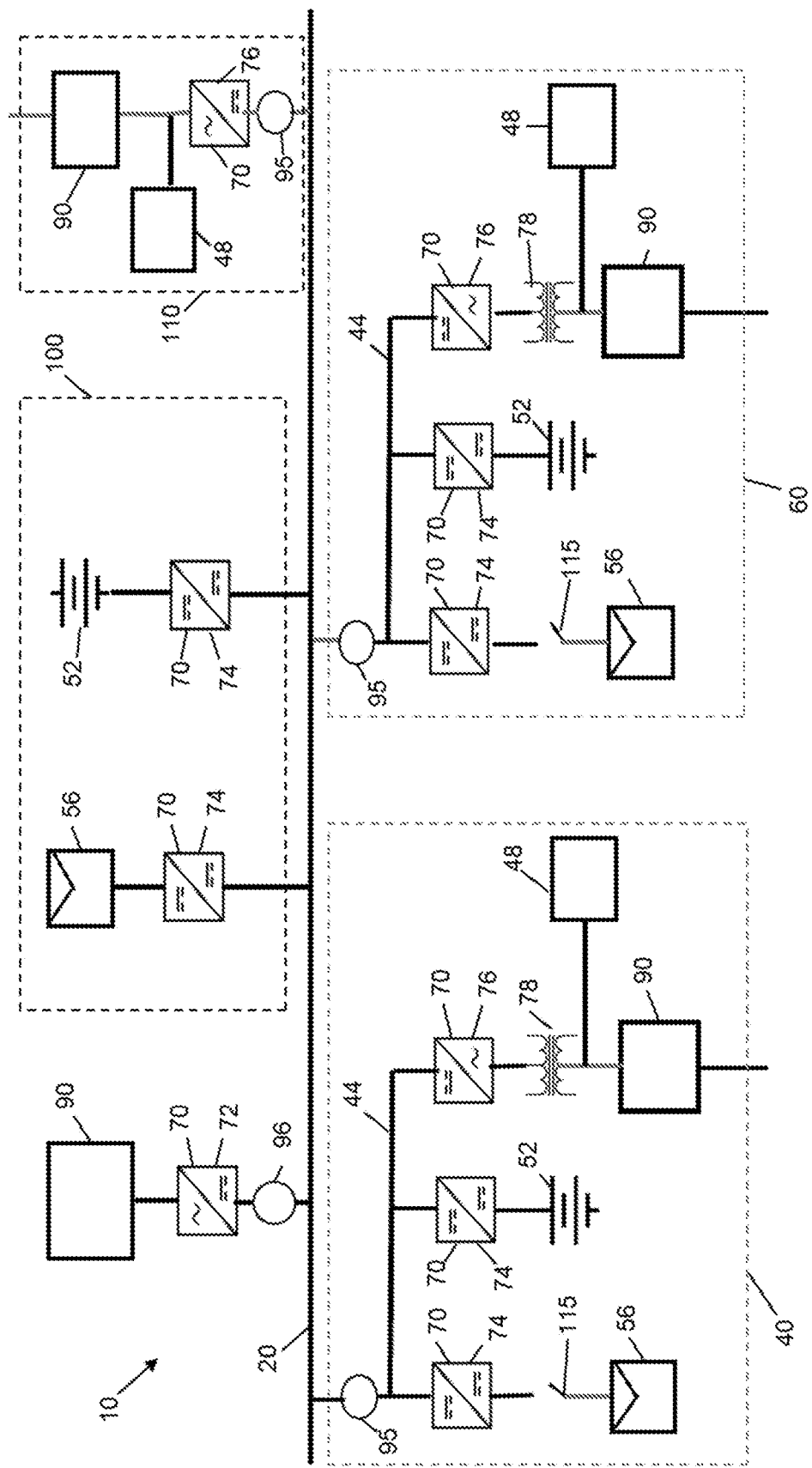
FIG. 2 is a more detailed block diagram representation of the hybrid power system of FIG. 1.

An interface device 70 can be one of several interface devices 70 used to couple a generating source 56, storage device 52, or load 48 to a local or common electrical bus 44, 20. With reference to FIG. 2, interface devices 70 include an AC to DC converter 72, a regulator 74, a DC to AC inverter 76, and a common bus regulator (not shown). The AC to DC converter 72 refers to an interface device 70 that converts an AC input to a DC output, for example, a rectification device. In other aspects of the present disclosure the interface device 70 can be a wire, a fuse, a switch, or any other suitable interfacing mechanism.

The regulator 74 refers to an interface device 70 that converts a DC input at a first voltage potential to a DC output at a second voltage potential. This can be a semiconductor switching and regulating device or a meter and a feedback loop at a connection. In this regulator configuration, energy and power flow through the regulator is based on adjustment of a DC operating voltage band on at least one of the two connections to the regulator, and, based on the actual bus voltage, current flows in one or the other direction. The common bus regulator can be a direct connection with an electricity meter providing feedback to a controller with respect to the passage of electricity therethrough. The regulator refers to a power control and conversion device that is configured to enable changing the voltage at the input thereof to a different voltage at the output thereof, and is used with respect to a local bus, as well as a common bus connected to a plurality of local buses.

The DC voltage across the regulator between a local bus 44 and the common bus 20 will be maintained to be equal. For the case in which the regulator is configured as a meter and a feedback loop, the voltages on either side of the regulator would be maintained to be equal. Feedback from the meter indicating power transfer therethrough is used to adjust the voltage bands in the peer-to-peer distribution system 10 at each local node. When doing this, a controller in the peer-to-peer distribution system 10 determines that the local bus voltage is too high or too low (depending on the band adjustment) and attempts to increase or decrease the system voltage by pushing power into the common bus or absorbing power from the common bus.

With power feedback in a control loop with the voltage bands, the voltage bands are constantly adjusting to meet a desired set point of x kw of power flow in/out. In this case, converters 72 and regulators 74 in the local node push/pull power from the bus.

The inverter 76 refers to an interface device 70 that converts a DC input to an AC output. Preferably, each converter 72, inverter 76, and regulator 74 is also configured between an on and an off mode, where in the on mode power or energy transfer is allowed therethrough, and in the off mode power or energy transfer therethrough is disabled. Alternatively, a switch can be connected between the local bus 44 and the converter 72, inverter 76, and regulator 74, at the output of the converter 72, inverter 76, and regulator 74, or combinations thereof. The switch in this case is within the semiconductor device functioning as the converter, regulator, or inverter, and these components are also able to be physically turned off by switching a contactor internal thereto, or just disabling the switching functions therein while the device remains powered, enabling fast response times in the event of a change in conditions requiring a fast transient response.

Figure 3:
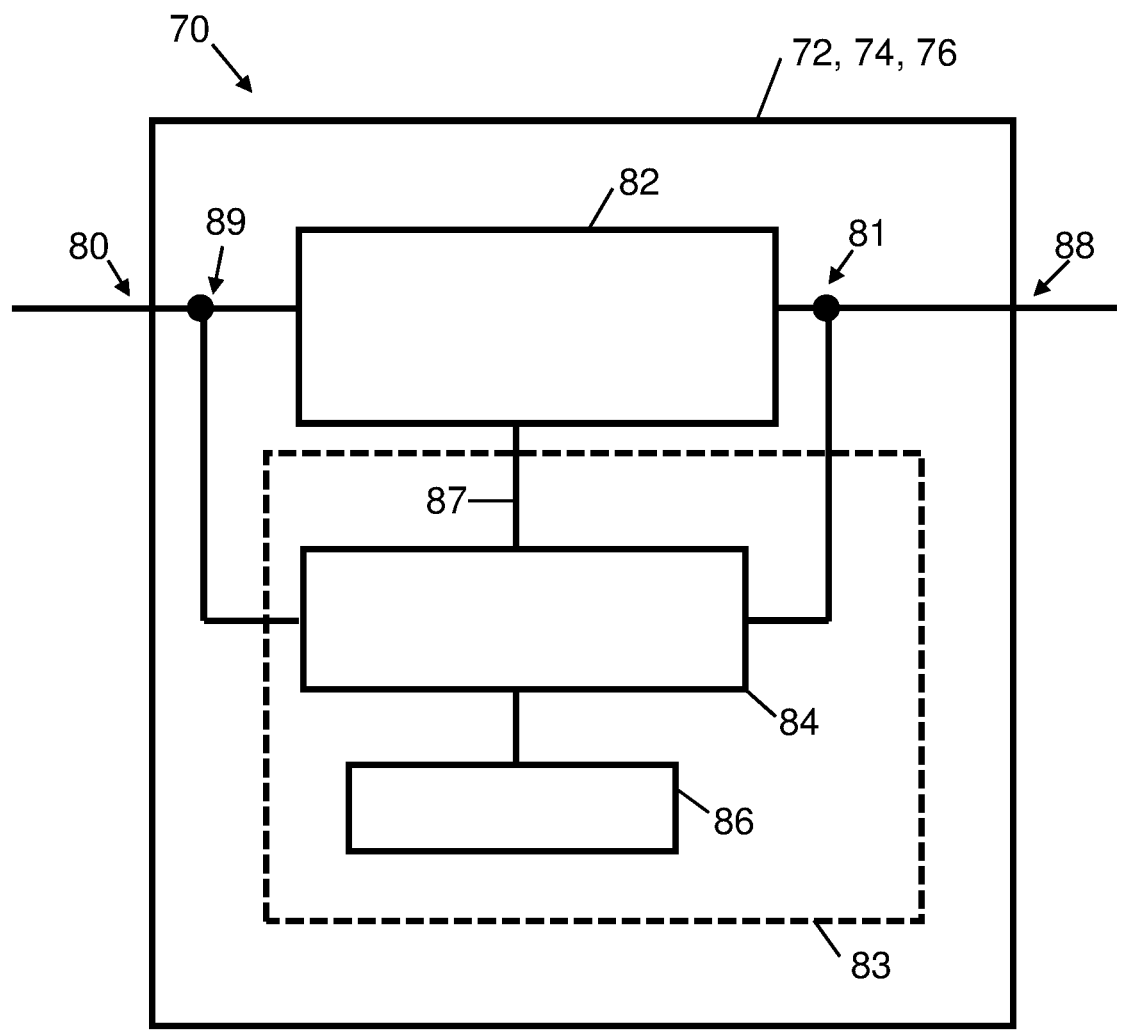
FIG. 3 is a block diagram representation of an interface device incorporated within the hybrid power system of FIG. 2

Referring to FIG. 3, each of the interface devices 70 includes similar fundamental components. The converter 72, inverter 76, and regulator 74 include a power electronics section 82 configured to convert the voltage and/or current present at the input 80 to a different voltage and/or current present at the output 88. The power electronics section 82 includes multiple power electronic devices, such as transistors, silicon-controlled rectifiers (SCRs), thyristors, and the like that are controlled by switching signals 87 to selectively conduct the voltage and/or current between the input 80 and the output 88 of the interface device 70.

One or more sensors 89 can be provided at the input 80 to measure a current and/or voltage level at the input 80 and provide signals to a control unit 83. One or more sensors 81 can be provided at the output 88 to measure a current and/or voltage level at the output 88 and provide signals to the processor 84. Either the sensors 89 at the input 80 or the sensors 81 at the output 88 monitor the voltage level present on the local bus 44, depending on whether the input 80 or the output 88 is connected to the local bus 44, and the other sensors monitor the voltage level of a load 48, storage device 52, generating capacity 56, and local bus 44 to which the interface device 70 is connected.

The control unit 83 of each interface device 70 preferably includes a processor 84 capable of executing a series of instructions, or a module, to send control signals to the power electronic devices 82 and memory 86 in communication with the processor 84 for storing the module capable of executing on the processor 84. The signals from the sensors 81, 89 corresponding to the voltage and/or current at the input 80 and output 88 of the interface device 70 are read by the module executing on the processor 84. The module outputs the switching signals 87 to the power electronic devices 82 to regulate power flow through the device. Alternately, the control unit 83 can include dedicated control hardware to generate switching signals 87 and regulate power flow through the device. For example, a boost converter, as is known in the art, can be used to convert a first DC voltage level to a higher, second DC voltage level.

Referring again to FIG. 2, a more detailed aspect of the peer-to-peer distribution system 10 is illustrated. A common bus 20 is electrically connected to a first local node 40, a second local node 60, and a third local node 110. Each local node 40, 60, 110 includes a local bus 44 and at least one of a load 48, storage device 52, and generating capacity 56. Each node 40, 60, 110 can include at least two of a load 48, storage device 52, and generating capacity 56 and can include all three as well as multiples of each. Each node 40, 60, 110 can use, generate, and/or store electrical energy for use within that node. Each node 40, 60, 110 can also draw electrical energy from or supply electrical energy to the common bus 20.

Each load 48, storage device 52, and generating capacity 56 can be connected to the associated local bus 44 through an appropriate interface device 70. For example, a generating capacity 56 in the form of a photovoltaic (PV) unit will generate DC electrical energy. The interface device 70 connected between the PV unit and the local bus 44 will be a regulator 74 because the local bus is a DC bus. In an alternative aspect, the interface device 70 will be a DC to AC inverter 76 if the local bus is an AC bus.

The generating capacity 56 can be of any type known in the art, including but not limited to wind, photovoltaic, hydroelectric, fuel cell, tidal, biofuel, biomass, or other renewable, advanced, or conventional generating sources. Each of these sources generates power that is output as either an AC or a DC voltage with an amplitude suited to the type of generating source. The voltage output from an AC generating source is provided as an input voltage to the power electronics 32 of the AC to DC converter 72. The power electronics 32 are configured to convert the voltage from the source to a desired DC voltage level as an output voltage to the local bus 44. For example, the desired DC voltage level can be 650 volts if the power system connects to a 460-volt utility grid. Alternately, the DC voltage level can be any desired DC voltage, such as 48 volts, that can be required by a specific DC load. The DC voltage level can be allowed to vary within a preset range and selected to provide optimum energy conversion between a generating source and the local bus 44. Each AC to DC converter 72 can manage unidirectional or bidirectional power flow between the local bus 44 and the energy or power source connected to the AC to DC converter 72. For example, the AC to DC converter 72 can allow bidirectional power flow between the local bus 44 and the utility grid 90 where returning energy and power to the utility grid 90 is possible, while allowing only unidirectional power flow from a generator or wind turbine to the local bus 44.

Those of ordinary skill in the art will recognize that a bidirectional AC to DC converter acts similarly but in reverse to a bidirectional DC to AC inverter and the two terms are sometimes used interchangeably. Further, throughout the examples and alternatives disclosed herein, one of ordinary skill in the art will know to select the appropriate interface device 70 depending on the power conversion, if any, needed and the nature of the electrical energy on both side of the interface device 70.

Additional disconnect, safeguard, and power control and conditioning devices can be connected where needed in the peer-to-peer distribution system 10 as is known in the art. For example, the first and second local nodes 40, 60 in FIG. 2 include switches 115 between the generating capacity 56 and the interface device 70.

Similarly, an AC load 48 can be connected to a local bus 44 through a DC to AC inverter 76. Such connection can also include a transformer 78 if necessary. It is further understood that the converter 72 between the utility grid 90 and the local bus 44 operates as an inverter 76 when transferring power from the local bus 44 to the utility grid 90. The power electronics 82 of each inverter 76 can be configured to allow bidirectional power flow between the local bus 44 and an AC load 48. Thus, if an AC load 48 enters a regenerative operating condition, the power generated by the AC load 48 can be returned to the local bus 44. Any number and combination of loads can be connected to the system, such that a load can be connected to the local bus 44 either directly, through the inverter 76, through a DC-to-DC regulator 74, or any combination or multiple thereof.

Likewise, a storage device 52 or another device having a DC voltage potential output or input can be connected to a local bus 44 or the common bus 20 through a regulator 74 if such local or common bus 44, 20 is a DC bus. As shown in FIG. 2, the regulator 74 can be connected, for example, to a PV generating capacity 56 or a storage device 52. The storage device 52 can be a battery, a fuel cell, a flow battery, a pumped hydro, thermal mass, inertial mass/flywheel, super capacitors, or any other suitable energy storage device or mechanism. The regulator 74 can also be connected, for example, to a DC load (not shown). Each storage device 52 can be made of either a single device or multiple devices connected in series, parallel, or a combination thereof as is known in the art. In some aspects, the local bus 44 operates at a first DC voltage level and the storage device 52 operates at a second DC voltage level. Alternately, the local bus 44 and the storage device 52 can operate at the same DC voltage level where the regulator 74 controls current flow between the input 80 and the output 88. Each regulator 74 can manage unidirectional or bidirectional power flow between the local bus 44 and the storage device 52 or other DC device connected to the regulator 74. For example, the regulator 74 can allow bidirectional power flow between the local bus 44 and a storage device 52 while allowing unidirectional power flow from a PV array to the local bus 44 or from the local bus 44 to a DC load. Alternatively, a storage device 52 can be connected to a local bus 44 or the common bus 20 through a DC to AC inverter 76 if such local or common bus 44, 20 is an AC bus.

The common bus regulator if present is electrically connected between the local bus 44 and the common bus 20, which are connected to additional systems 10. The common bus regulator is a bi-directional device such that DC power or energy can flow from the local bus 44 to the common bus 20 or from the common bus 20 to the local bus 44, as required by the power or energy needs of the peer-to-peer distribution system 10 and the available or needed energy or power on the common bus 20. Additionally, where the local bus 44 and the common bus 20 operate at different voltage potentials, the common bus regulator steps up, or steps down, the voltage of the energy or power passing therethrough depending on the desired potential at the output thereof, for example, of the local bus 44 or the common bus 20.

The peer-to-peer distribution system 10 can optionally include a connection to a utility grid 90 to supply electrical energy to the common bus 20 when the local nodes in total are not supplying sufficient electrical energy to meet demand within the local nodes. Each local node 40, 60, 110 can optionally include a connection to a utility grid 90 to supply electrical energy to the local bus 44 when insufficient electrical energy is available to meet demand within a local node. A grid connection 90 can be made to the common bus 20 through an AC to DC converter 72 if the common bus is a DC bus. A grid connection 90 can directly supply the common bus 20 if the common bus 20 is an AC bus. A grid connection 90 can also directly supply AC loads.

The peer-to-peer distribution system 10 can also optionally include a community node 100 electrically connected to the common bus 20. The community node 100 includes one or more of a load 48, a storage device 52, and a generating capacity 56. Because these are electrically connected directly to the common bus 20, they are essentially shared by the local nodes. Each community node device can be connected to the common bus 20 in the manner described above for the type of device.

Each local node 40, 60, 110 and community node 100 is optionally connected to the common bus 20 through an electrical meter 95. In this manner, the power and energy supplied to or drawn from the common bus 20 by each local node 40, 60, 110 and community node 100 can be measured and accounted for in a transactional system as described below.

The local bus 44 if DC can be either a single level or a multi-level DC bus. A single level bus includes a first DC rail and a second DC rail. Each DC rail can be, but is not limited to, a single terminal, multiple terminals connected by suitable electrical conductors, or a bus bar. The single level bus establishes one voltage potential between the first and second DC rails. A multi-level DC bus includes the first and second DC rails and further includes at least a third DC rail. The multi-level DC bus establishes at least two different voltage potentials between the DC rails. For example, a multi-level DC bus can include a first DC rail at a positive voltage potential such as 325 volts, a second DC rail at a neutral voltage potential, and a third DC rail at a negative voltage potential such as -325 volts. The net voltage potential between the first and the third DC rails is twice the voltage potential, or 650 volts, as the potential between either of the first or third DC rails and the neutral second DC rail. Thus, three different voltage potentials exist on the multi-level DC bus. Each converter 72, inverter 76, and regulator 74 can connect to any of the three voltage potentials according to the requirements of the load 48, storage device 52, or generating capacity 56 connected to the respective interface device 70.

A high-level controller can be connected via a network medium to the peer-to-peer distribution system 10, any converter 72, inverter 76, and regulator 74 therein, and to a point of charge meter 96 (see FIG. 2) at the entry point of a grid connection 90. The network medium can include, for example, CAT-5 cable for an Ethernet connection, an industrial network cable, a proprietary cabling connection, one or more routers, switches, or other network devices, a wireless device in communication with both the high-level controller, local controllers, one or more of the interface devices 70, or any combination thereof. The high-level controller and/or the local controllers can also be connected to a knowledge system. The knowledge system can either be local or remote. The controllers are connected to the knowledge system via the appropriate network medium and either an internal network, such as an intranet, or via an external network, such as the internet, or hard-wire connected. Alternatively, communication for control can be a superimposed DC voltage on a DC bus or other multiplexed signaling protocols.

A single high-level controller can be coupled to multiple systems 10, where each of which becomes a local node connecting to a common bus, such as common bus 20 of FIGS. 1 and 2. Each local node connected to a common bus can also or alternatively be controlled by its own local controller. The point of charge meter 96 is used when node has a grid connection and AC loads connected at the grid connection, and where there is the desire to provide power from the peer-to-peer distribution system 10 that is sufficient to cover the load exactly so no power is drawn from the utility grid 90. Further, with non-export requirements, this point of charge meter 96 provides feedback to a controller so the controller can command the grid-tied inverter with a real time kw command, so it matches the customer load only with no excess sent to the grid. Additionally, the point of charge meter 96 provides active (kw) and reactive (kvar) power feedback, power factor, and voltage to the controller. This feedback to the controller allows the controller to generate compensating kvar commands and kw commands. For example, if the power factor is low and customer is being charged for this by the utility, using this feedback the controller will command kvar until the desired power factor is met. The same applies to voltage sags and swells on the grid to help protect customer equipment.

Each controller can include one or more user interfaces. The user interface can provide output or receive input from a user and can include a display device and an input interface, including but not limited to, a keypad, a mouse, a touchpad, or a touchscreen, a cell phone or smart phone application, or an internet- or cloud-based user interface. Each controller can be located proximate to or incorporated within the peer-to-peer distribution system 10. Optionally, each controller can be located remotely from the peer-to-peer distribution system 10 and connected via a communication interface and the network medium. Each controller includes one or more memory devices to store information regarding operation of the peer-to-peer distribution system 10 as discussed in more detail below. The memory devices can be volatile, non-volatile, or a combination thereof. Each controller further includes a storage medium, where the storage medium can include fixed or removable storage, such as a magnetic hard disk drive, a solid-state drive, a CD-ROM drive, a DVD-ROM drive, memory card reader, cloud storage or a network operating center storage, and the like. At least a portion of the storage medium and/or the memory device provides non-transitory storage. Each controller further includes a processor operable to execute one or more modules stored on the storage medium and/or in the memory devices to generate command signals for each of the interface devices, where the command signals control power flow within each interface device 70, and, in other than the utility grid 90 connection, enable of control energy and power flow to or from a device by setting a voltage band in the interface device 70 using pre-programmed, and thereby controllably-selectable, voltage bands in each interface device 70 to cause the voltage of an energy or power providing device to reach the connection to the local bus 44 at a higher voltage than the local bus 44 and thus cause energy or power to flow into the local bus 44 from the energy- or power-providing device, or cause the voltage at the connection to be less than that of the local bus 44, thereby causing energy or power flow from the local bus 44 at the connection point, to, for example, flow into and charge a storage device 52 such as a battery. In the case of a converter 72 between the utility grid 90 and the local bus 44, the controller also includes commands for kw and kvar requirements. Here, the controller sets, and when needed changes, through the communication link and protocol, voltage bands within the interface devices 70 to cause energy or power to flow therethrough in a selected direction, or not pass therethrough. Additionally, the controller uses the battery management system internal to the battery to control the flow of current in or out of the battery of the storage device 52 when the state of charge thereof is too high or too low, that is, outside of the desirable operating range thereof. Further, the controller monitors the state of every device with which it is in communication, and stores information regarding operating conditions thereof in storage. Where a fault or trip has occurred with respect to any device, the controller provides notice to a user thereof via e-mail, text, or other communication protocol.

The command signals can be transmitted to the interface devices 70 via the communication interface and the network medium, using any standard communication protocol possible in the transmission environment. According to one aspect of the disclosure, the controller is an industrial computer configured in a rack-mount formation. The interface devices 70 and the controller can each be designed for insertion into the same rack configuration such that a controller can be delivered with the interface devices 70 in a single housing as a stand-alone system. Alternately, the controller can be implemented in part or in whole on a separate server, where the server is located, for example, at a facility owned by the manufacturer of the interface devices 70. Optionally, the server can be implemented in part or in whole within the cloud using computing resources on a demand basis.

An exemplary knowledge system can include one or more user interfaces. The user interface can provide output or receive input from a user and can include a display device and an input interface, including but not limited to, a keypad, a mouse, a touchpad, or a touchscreen. The knowledge system can be located proximate to or incorporated within the peer-to-peer distribution system 10. Optionally, the knowledge system can be located remotely from the peer-to-peer distribution system 10 and connected via a communication interface and the network medium. The knowledge system includes one or more memory devices to store information related to operation of the hybrid power system as will be discussed in more detail below. The memory devices can be volatile, non-volatile, or a combination thereof. The knowledge system further includes a storage medium, where the storage medium can include fixed or removable storage, such as a magnetic hard disk drive, a solid-state drive, a CD-ROM drive, a DVD-ROM drive, memory card reader, and the like. At least a portion of the storage medium and/or the memory device provides non-transitory storage. The knowledge system further includes a processor operable to execute one or more modules stored on the storage medium and/or in the memory devices. The knowledge system also includes a database stored in the storage medium that contains data that can influence operation of the peer-to-peer distribution system 10. The knowledge system is in communication with the controller via the communication interface and the network medium to transmit data to or receive data from the controller. According to one aspect of the disclosure, the knowledge system can be implemented in part or in whole on a separate server, where the server is located, for example, at a facility owned by the manufacturer of the interface devices 70 or by a third party. Optionally, the server can be implemented in part or in whole within the cloud using computing resources on a demand basis.

Figure 4:
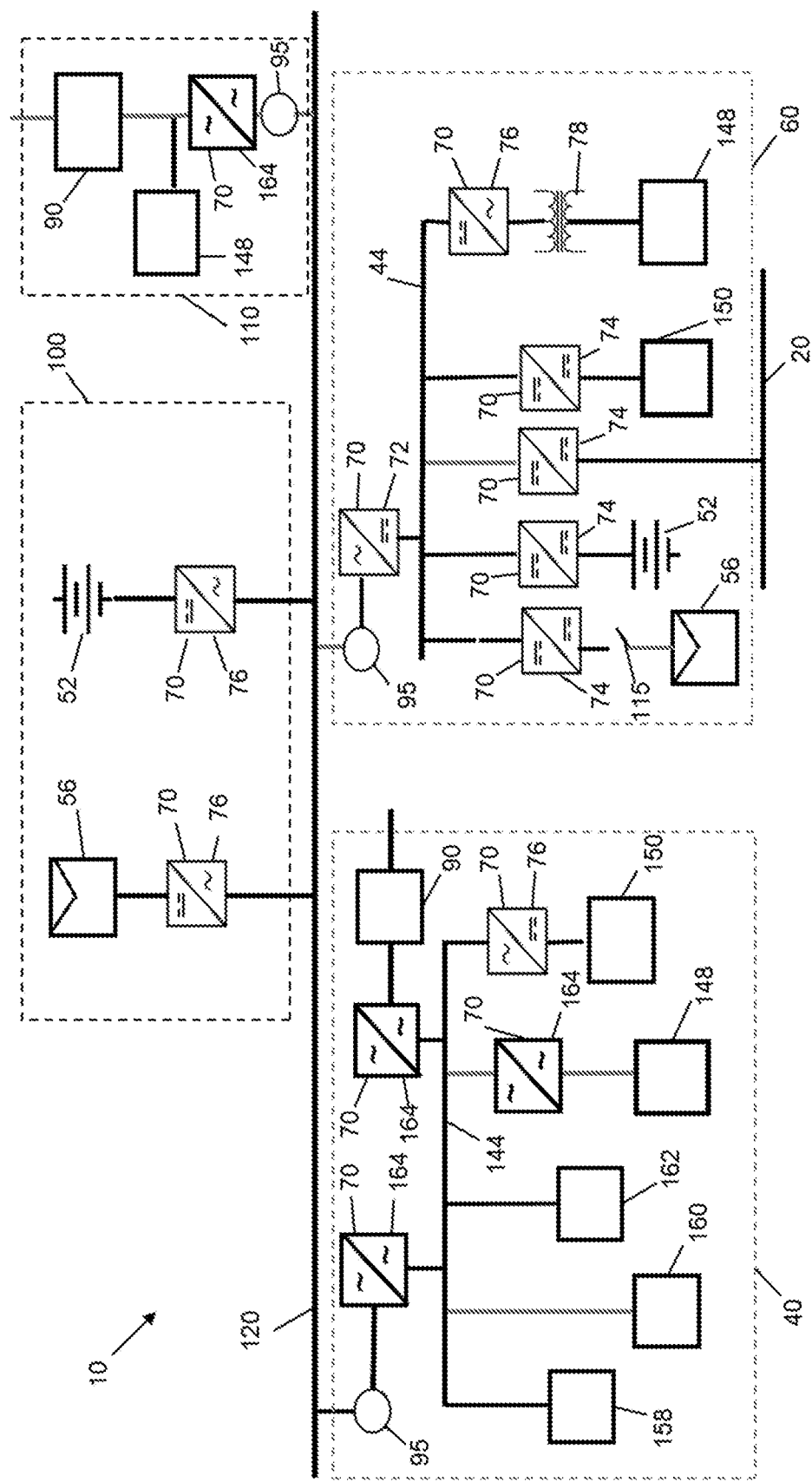
FIG. 4 is a block diagram representation of a hybrid power system employing AC and DC buses according to another aspect of the disclosure.

As illustrated in FIG. 4, an alternative hybrid aspect of the peer-to-peer distribution system 10 is described. The peer-to-peer distribution system 10 contemplates a stand-alone grid system that is independent of the utility grid. In this aspect, the peer-to-peer distribution system 10 includes a local AC bus 144 in addition to the local DC bus 44. Similar to the aspect described in FIG. 1, the local bus 44 can be either a single level or a multi-level bus. The peer-to-peer distribution system 10 can include generating sources of any type known in the art as described above. Further, the peer-to-peer distribution system 10 can include AC loads 148, DC loads 150, or a combination thereof, and can also include a connection to a common AC bus 120.

In the illustrated aspect, a generator 158 is connected directly to the local AC bus 144. A generator controller is provided to keep the generator operating at the speed necessary to provide an AC voltage synchronous to the local AC bus 144. The peer-to-peer distribution system 10 can also include reactive power compensation devices. A synchronous condenser 160 and a capacitor bank 162 are both shown connected to the local AC bus 144. Still other reactive power devices such as a thyristor controller reactor or a static VAR compensator (not shown) can be connected to the local AC bus 144 as well. The synchronous condenser 160 includes a controller to regulate the amount of reactive power supplied to the local AC bus 144. Similarly, the capacitor bank 162 includes a controller where the capacitor bank controller can selectively open and close switches to connect capacitors in the capacitor bank 162 to the local AC bus 144, thereby affecting the power factor and AC bus voltage levels of the local AC bus 144. In an alternative aspect (not shown), a wind turbine can be connected to the local AC bus 144 via an AC-to-AC converter. The AC/AC converter can first convert the variable AC input from the wind turbine to a DC voltage and subsequently convert the DC voltage back to a desired AC voltage synchronous with the local AC bus 144. Additionally, here the local AC bus 144 is connected to a common AC bus 120 through a converter 164, for example a solid-state converter or a transformer device.

The local bus 44 of FIG. 4 includes a number of the same components connected to the bus as illustrated in FIG. 2. A generating capacity 56 in the form of a PV unit generates DC voltage at a first voltage potential and a regulator 74 converts the voltage from the PV array to the voltage on the local bus 44. A storage device 52 is similarly connected to the local bus 44 via a regulator 74. The local bus 44 can also include an inverter 76 connected between the local bus 44 and the common AC bus 120. The inverter 76 can operate in a bi-directional manner as either a converter or an inverter to share power between the local bus 44 and the common AC bus 120. Also, as with the local bus 44 of the configurations shown in FIGS. 1 and 2, here the local bus 44 can be connected to a common DC bus 20 through a regulator 74 such that a peer-to-peer distribution system behind the utility meter includes both an AC common bus 120 and a DC common bus 20. Additionally, in another aspect, only one of a common DC bus 20 or a common AC bus 120 is used in the peer-to-peer distribution system 10.

According to the illustrated aspect, each bus 44, 144 includes loads connected to the respective buses 44, 144, as well as the connection, through the common bus converters 74, to respective common buses 20, 120. DC loads 150 are illustrated as connected to the local bus 44 via a regulator 74. Similarly, AC loads 148 are illustrated as connected to the local AC bus 144. An optional AC-to-AC converter 164 is shown if the local AC bus 144 is regulated at a voltage or frequency other than that required by the AC load 20. Optionally, the local AC bus 144 can be regulated at a voltage and frequency suitable for the AC load 20 to be connected directly to the local AC bus 144.

A controller is connected to the peer-to-peer distribution system 10 via the appropriate network medium. The controller is in communication with each of the converters and controllers in the peer-to-peer distribution system 10 to maintain stable operation of the independent grid.

An alternative aspect of a peer-to-peer distribution system 10 is also shown in FIG. 4 wherein the configuration optionally includes a utility grid 90 connection through a converter 164, here configured to serve as a voltage changing device as between the AC grid and the local AC bus 144. In this configuration, the remaining local nodes connected to the common AC bus 120 need not be directly connected to the grid if a grid connection is desired. As detailed later herein, each peer-to-peer distribution system 10 on the common AC bus 120 can export energy or power to the utility grid and a value of that energy or power can be tracked for later settlement as between the utility and the user, or as among the users of the common AC bus 120.

Multiple exemplary systems 10 with alternatives and varied aspects have been described herein. Various other systems including different combinations of components, generating sources, buses, storage devices, and the like can be used without deviating from the scope of the disclosure. As will be discussed in more detail below, it is further contemplated that multiple systems can each include a separate controller to regulate the components within their respective system, but the controllers can further be in communication with each other to regulate power flow between systems 10.

In operation, the controllers are operable to coordinate power flow within the peer-to-peer distribution system 10, between the peer-to-peer distribution system 10 and another system, between a peer-to-peer distribution system 10 and a utility grid 90, and between local buses 44, 144 and common buses 20, 120. The peer-to-peer distribution system 10 can be of a type described in U.S. Pat. No. 9,093,862, which is incorporated herein by reference to the extent it does not conflict herewith. Optionally, the peer-to-peer distribution system 10 can include any combination or multiples of other generating sources, loads, storage devices, and/or interface devices that can be electrically connected in almost any combination provided the appropriate interface devices are used and each local node is metered to monitor electrical energy transferred to and from a bus. The controller receives information on the power flow between generating sources, loads, and storage devices, information from the knowledge system, and information relating to the availability of power on a common bus, a need for power on a common bus, or the availability of additional storage on or through a common bus.

A local controller will adjust the best (most economical, most weather compatible, etc.) source/load voltage band of each interface device in its node to assure the best asset is being used to meet the requirements of the setpoint/meter feedback. A requesting node has lower priority than a sending node in the sense that a receiving node cannot take more energy than a sending node is willing to provide. Priority is set by allowing more voltage range on the sending node than the receiving node. Similarly, a sending node cannot send more than a receiving node is requesting in the sense that a sending node cannot force a receiving node to take power.

In another aspect, if a converter is put in place the receiving node power command will be overridden by the common bus DC voltage low limit through use of voltage bands compared with actual voltage so as not to collapse the voltage on the common bus. The sending node has a high voltage limit on the common bus so as not to over-voltage the common bus and cause damage or trip of other devices connected to the common bus.

A local controller is in communication with each of the interface devices 70 via the network medium. The interface devices 70 can transmit information related to the level of power being generated by a generating source 56, drawn by a load 48, 148, 150, or transferred between a storage device 52 and the local bus 44 at a periodic interval to the controller. Optionally, the peer-to-peer distribution system 10 can include one or more sensors monitoring the voltage and/or current transferred between each interface device 70 and the local bus 44. According to still another aspect, a first portion of the interface devices 70 can periodically transmit information related to power flow through the device and a second portion of the interface devices 70 can include the sensor.

In response to the information received from the interface devices 70 and from the knowledge system, the local controller generates commands for the interface devices 70 to transfer either real or complex power (for example, a kw command or a kvar command) as a result of the information received. Each command can be transmitted via the network medium to the respective interface devices 70. The interface devices 70 can then monitor and adjust the power being transferred through the interface device 70 to correspond to the desired command generated by the controller.

As will be described herein, the availability of the common bus 20 to the peer-to-peer distribution system 10 allows power generated by the peer-to-peer distribution system 10 that is considered excess to the peer-to-peer distribution system 10 to be exported to other users/local nodes through the common bus 20, without the need to use the local regulated utility grid or distribution network. Referring now to FIG. 2, a connection of nodes to the common bus 20, and the ability to share power between nodes without accessing the utility grid, are shown.

In FIG. 2, an exemplar peer-to-peer distribution network 10 is shown in which three local nodes 40, 60, 110 and one community node 100 are electrically connected to a common bus 20. Although three nodes are shown, any number of nodes can be used and connected to the common bus 20. Here, for purposes of illustration, each local node 40, 60, 110 includes an AC load 48, for example lighting, appliances, computers, servers, and the like commonly found in residences and businesses. Two local nodes 40, 60 include a storage device 52, for example a battery, and a generating capacity 56, for example one or more PV units. An inverter 76 interconnects each set of AC loads 48 and either the local bus 44 or the common bus 20. Each storage device 52 and generating capacity 56 is connected through a regulator 74 to the common bus 20. Here, an optional metering device 95 is located electrically between the common bus 20 and each local bus 44. Each set of loads 48, storage device 52, and generating capacity 56 is electrically connected to the AC grid through their respective local buses 44. Bi-directional or unidirectional meter 96 is connected between the grid 90 and the common bus 20. Additional meters can be located at any point between devices if additional data and control is desired. The interface devices 70 and the meters 95, 96 are connected to one or more controllers and a knowledge system such that feedback is provided to the interface devices 70 from the controllers. In the event the utility grid 90 goes out or is disconnected, the appropriate interface devices 70 are signaled to switch to an "off grid" mode (no kw or kvar commands), and only maintain the required voltage and frequency to the local AC load 48 as long as energy or power is available there to do so. When the utility grid 90 comes back, or is reconnected when both sides are in synch, that is, the voltage and frequency match or nearly match and are in phase, the appropriate interface devices 70 return to the grid-connected mode after a 5-minute wait period, a UL requirement. Note during this 5-minute wait period the local AC load 48 is being energized by the grid 90 so the transition to the grid 90 is seamless. When the inverter waiting period times out and the inverter comes back on-line, the inverter returns to matching its output to the load demand by monitoring the AC meter 96 from the utility grid and exporting power to make the meter 96 between the grid and the switch to be zero kw.

With respect to AC buses, power transfer is not on voltage but on phase angle and frequency control. Voltage is primarily related to reactive power controls. For real power transfer the phase angle is taken into consideration. Reactive power must also be considered.

In this configuration, an energy or power need in any of the nodes can be supplied by generating capacity or storage in the node or from any other node connected to the common DC bus, as well as directly into the node through the connection to the grid.

In the exemplary configuration of FIG. 2, each load 48, storage device 52, and generating capacity 56 can include one or more types. For example, one local node can have access to solar generating capacity only, another local node to a gas generator, and another local node to both. Additionally, each local bus can be connected to more than one user of electricity. For example, a node can be connected to a plurality of residences, and each residence can have a separate meter in addition to the node meter 95 to record the amount and timing of electrical usage thereof, or only the meter 95 can be present. A bus can include branches therefrom with a number of users or users who are physically distant from one another, or the bus can be a single nodal point.

From the configuration example of FIGS. 2 and 4 it can be appreciated that many different configurations of the systems 10 including common shared resources such as common storage and common generating capacity all connected to the common bus 20 are possible. Additionally, in each case, the connection to the utility grid 90 can be provided for backup purposes, with a desired intent that the owners or users of the peer-to-peer distribution system 10 at each node will preferably use the energy available on the common bus 20 over that available from the utility grid 90. Where a community generating capacity has sufficient output, in combination with the other generating capacities and storage devices within the nodes and the community storage device, the grid connection 90 need not be present. As a result, the configurations herein provide a local electrical distribution network that can operate off grid. Alternatively, instead of a grid 90 connection to each peer-to-peer distribution system 10, a grid connection 90 can be made to the common bus 20 through a converter (not shown), allowing one or all of the individual systems to not be connected to the utility grid 90.

Additionally, although a single level of local buses 44 have been described herein, the buses can include sub buses operating at different voltages, for example one bus operating at a relatively low voltage on the order of 24 to 48 V and connected to loads such as DC lighting, and another bus operating at a higher voltage, on the order of 380 V or 440 V, and connected to other loads such as appliances and light duty equipment such as office equipment or small industrial and shop equipment. Additionally, a common DC bus 20 (or multiples thereof), a common AC bus 120 (or multiples thereof), or both can be connected to a plurality of systems 10 to create common sharing of energy storage and generation capacity.

A common bus can be owned by an entity that is not drawing or supplying the electricity (power or energy) thereto, by at least one owner of a node or user or supplier of electricity to a node, or to the group of node owners or users. In each case, the individual nodes are enabled, as will be described further herein, to set pricing points for the receipt of energy or power at their node from the common bus, or transmission of energy or power from their node to the common bus. This information is maintained in a knowledge system, as described hereafter, and is accessible to the controller of the peer-to-peer distribution system 10 at each node to allow the controller to configure the devices connected to its local bus, and between its local bus and the common bus, to allow receipt of energy or power in the form of electricity from the common bus, or from the utility grid if a grid connection is present, as well as transmit energy or power in the form of electricity to the common bus, or to the utility grid if a grid connection is present based on user setting and an internal algorithm configured to predictably reduce the overall cost of electricity to the node.

Individual node owners can establish negotiation rules and only when negotiation is complete would power/energy transfer occur by two or more entities tied into a common DC distribution system. In such case the settlement would be done directly between the node supplier and the node user automatically, via a financial transaction network.

The local controller of a node can connect to the cloud and/or internet and provide metering, reporting, automatic emails, etc., in a manner similar to that of the central controller of an overall network.

In the exemplary configurations of FIGS. 2 and 4, certain individual nodes are connected to the utility grid 90 individually, and thus an interface device 70 in each node is used to control the flow of power from, or if allowed, to, the utility grid 90. The common bus 20 can be connected to the utility grid 90 through an interface dedicated to that purpose. In this case, the interface would control access of energy between the utility grid 90 and the common bus 20, and control a converter 72 to set the DC output voltage to the desired common bus voltage, as well as the AC voltage to the utility grid-desired voltage and frequency. Thus, the utility grid-supplied energy or power is behind the meter, for example, on a DC bus, before it is received through any node into a load 48.

Each interface device herein is also configured to operate with the common bus 20 based on DC voltages selected within a range to maintain stability on the common bus 20. The interface device 70 includes settable minimum and maximum voltages to establish a voltage band for passage of DC electricity therethrough with respect to the common bus 20 and the local bus 44. Power and energy can be consumed by any node, or supplied by any node, to achieve the power-energy balance needed to maintain the voltage on the common bus 20 within the required or set voltage ranges. This operating paradigm is set forth in U.S. Pat. No. 8,008,808, which is incorporated herein by reference to the extent it does not conflict herewith.

Multiple knowledge systems can be operable to provide information to the controller. A first set of knowledge systems are connected via the internet and a second set of knowledge systems are locally connected to a controller. A first knowledge system can be a weather service. The weather service can provide, for example, forecasts for upcoming weather conditions and provide historical weather data. The controller can be configured to examine historical weather data such as average daily temperatures, sunrise or sunset times, or average rainfall, where the historical weather data forms, at least in part, a past operating state of the peer-to-peer distribution system 10. The controller can also be configured to receive the weather forecasts indicating, for example, the expected temperature, the expected wind speed, or the expected level of sunshine over the next few hours or days, where the weather forecast forms, at least in part, a future operating state of the peer-to-peer distribution system 10. The remote weather service can also be configured to work in cooperation with a local weather station. The local weather station can include sensors generating signals corresponding to weather conditions proximate the controller. The sensors can measure, for example, wind speed, insolation, rainfall, and the like. These real-time signals can supplement the historical weather data from the weather service.

Another knowledge system can be an energy market. The energy market can be, for example, another local energy grid capable of supplying energy to or accepting energy from the peer-to-peer distribution system 10. Optionally, the energy market can be a commercial-level energy storage facility having the ability to supply energy to customers or local electric grids according to demand. The controller can receive data corresponding, for example, to a historical level of supply or demand from the other local energy grid or energy capacity from the energy storage facility. The historical level of supply or demand by the energy market can provide, at least in part, a past operating state of the controller. The energy market can also provide a forecast of expected energy supply or demand, where the forecast provides, at least in part, a future operating state of the controller. Further, the controller can receive real-time updates on pricing for energy from the local energy grid or energy storage facility, where the pricing can change in response to the supply and demand for available energy.

Still another knowledge system can be the energy company providing energy to the utility grid. The energy company can supply, for example, rate information defining the rate a consumer can pay to receive electricity based, for example, on the time of day or based on current electricity consumption. The utility provider can provide historical or real-time data corresponding to energy consumption at a particular facility or within a local region.

Yet another knowledge system can be a remote monitoring facility. The monitoring facility is identified as a remote facility connected via the internet. Optionally, a local monitoring system can also be located near or incorporated within the controller. The monitoring facility can track power flow within the peer-to-peer distribution system 10 and provide real-time and/or historical data of the power flow to the controller. The monitoring facility can track, for example, energy usage of the loads connected to the peer-to-peer distribution system 10 over time, such as over the course of a day, week, month, or longer, and identify trends in power flow. Similarly, the monitoring facility can track energy generation by the energy sources over time and identify trends in power generation. The monitoring facility can provide the tracked information to the controller, where the tracked information forms, at least in part, a past operating state of the peer-to-peer distribution system 10. The monitoring functions can be performed entirely within either the remote monitoring facility or the local monitoring system or, optionally, the monitoring functions can be shared between the two knowledge systems.

Another knowledge system is the common bus knowledge system. The common bus knowledge system includes a router or other device accessible over either the internet, intranet, or a wireless connection to which the controller of each node has access, a controller/computer that interacts with the individual controllers of a node and a memory. An individual having access to the controller can, through the user interface thereof, access the knowledge system and provide, or update, information concerning a currency value or other value at which they are willing to sell energy or power in the form of electricity into the common bus, as well as a currency value or other value at which they are willing to take energy or power in the form of electricity from the common bus. This information can be time dependent, as in the value offered is different at different times of day, on different days, and at different times on different days. The information, once entered, can be modified by the individual with access. The individual with access can also use an algorithm that over time sets the values based in part on the node's usage history. Additionally, the value need not be monetary, and instead could be in the form of exchange units, or portions of units, of the community of the common bus.

Each interface device 70 is able through a controller to transact the exchange of energy and power with any distribution systems with which it is interconnected. For example, an interface device 70 can transact business with any interface on any node on the common bus, and with the utility grid.

Overall system management infrastructure may be implemented for all peer-to-peer as well as the community for reconciling and built-in auto pay mechanisms and/or manual invoicing and/or establishment of unit accounts for all members.

Figure 5:
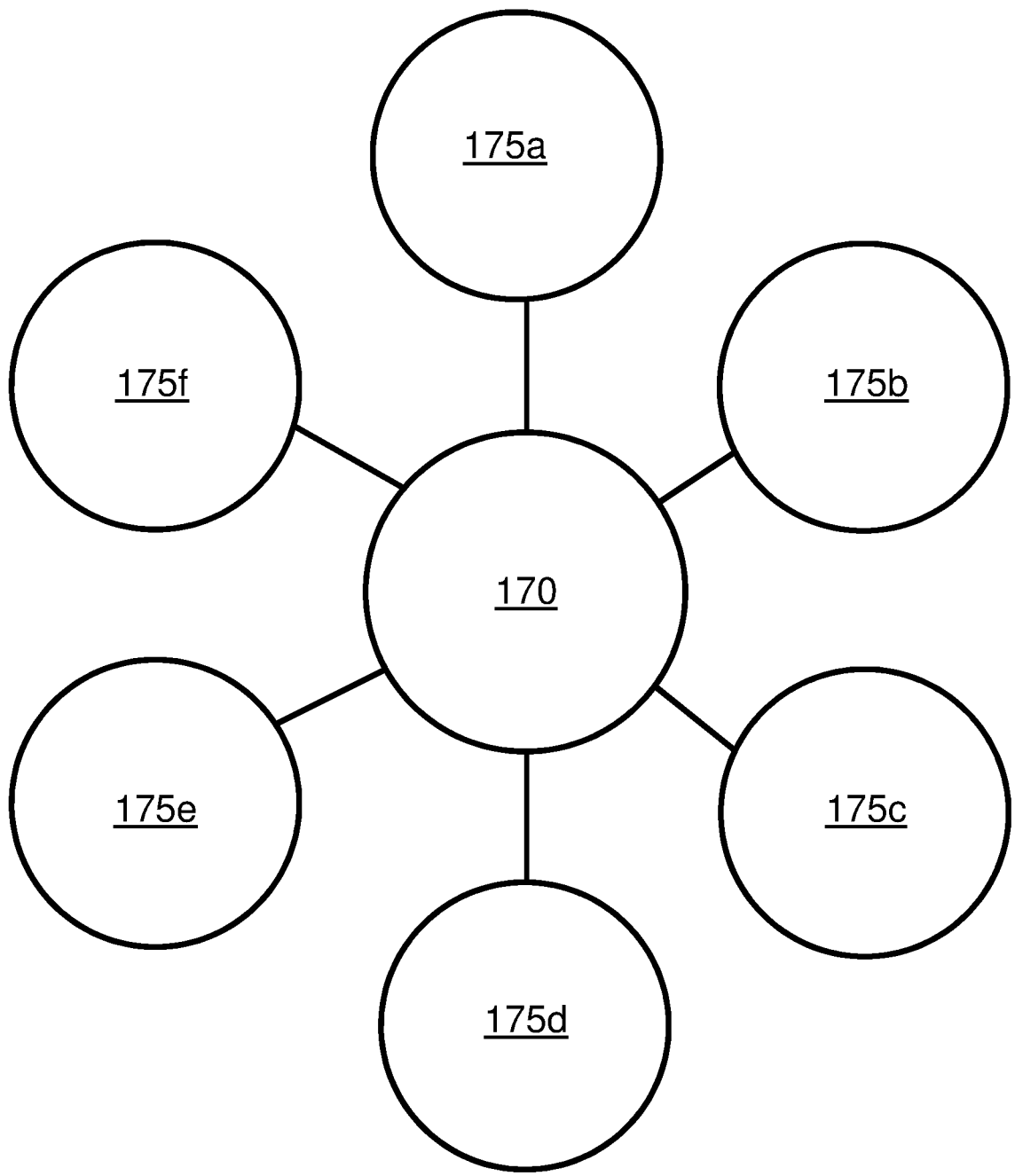
FIG. 5 is a block diagram representation of a transactional system employed by the hybrid power systems of FIGS. 2 and 4.

Referring to FIG. 5, a schematic illustration of a transactional system 170 for exchange of energy or power among the nodes 175*a-f* is shown. In one case, each node includes at least one metered location therein, and each node interface device 70 communicates with an overriding transactional system 170 that reconciles the delivery and consumption of power and energy at each metered point of that node. In this case, each node will broadcast its willingness to transact its power/energy needs or availability to the overriding transactional system 170 using the interface device thereof, along with terms of the transaction (time, type of transaction, reconciliation methods, etc.). The overriding transactional system 170 resolves a transaction by comparing offered rates and terms of any node to the offered rates and terms of all other nodes and attempts to find a match. When this "negotiation" is completed, that is, when a match occurs, the overriding transactional system 170 responds to each of the nodes in the transaction with the amount to be transacted, time of the transaction, etc. The revenue meters will then monitor and shared with its node what was transacted as well as the overriding transactional system 170 where it will reconcile the agreement.

Figure 6:
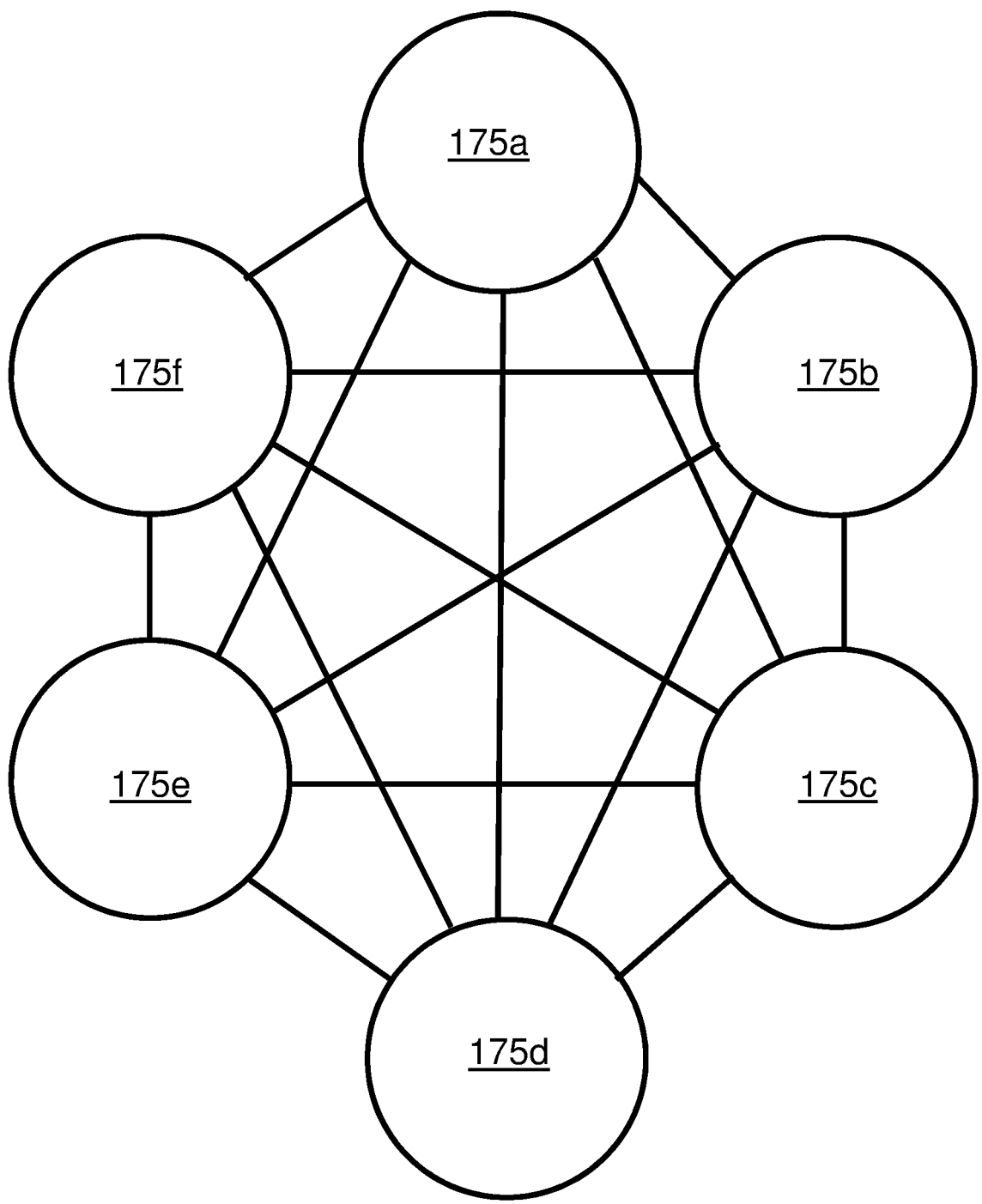
FIG. 6 is a block diagram representation of another aspect of a transactional system employed by the hybrid power systems of FIGS. 2 and 4.

As shown in FIG. 6, in another case, each node is connected to a communication network of any kind for communication directly between the nodes. Each node broadcasts its ability/desire to buy/sell power or energy through its interface device 70. Each node then can transact directly with another node without the need of going through the overriding transactional system 170 if a match occurs. The interface devices 70 of two nodes that have established an exchange agreement create transaction information that contains the same information and each node will report to the other the revenue metering, a validation, and a reconciliation of the amount of power and energy transacted.

Further, the transactions can be set so as to be reconciled per event by means of financial methods and monetary-linked transaction accounts. In another case the transacted amount of power and energy can be maintained on each node's interface device 70 (after the validation step above and confirmed by each node) and maintained as a running net shared power and energy over a time period. At the end of a predesignated time period this information is used to financially reconcile, as among the node users or owners, or used to maintain the balance of the "borrowed" power and energy as among the nodes. All of the terms for the transaction are established at the time of the negotiation between the nodes. Negotiation is automatic and a node operator, such as the owner or user, establishes the conditions of the negotiation. In addition to setting fixed guidelines for the transaction, a node operator can set a mode that will allow the negotiating devices to use steps to maximize the position with limits established to "not buy/sell" energy or power up to the limits set by the node operator. Additionally, a node can negotiate with multiple other nodes simultaneously to achieve the best value or price for its sale or purchase of energy or power.

Additionally, as described above, the nodes on a common bus can share their information on a common bus knowledge system. Furthermore, where a transactional system 170 for exchange of energy or power among the nodes is used, more complex transactions are possible. For example, each node can also offer storage capacity to the other nodes on the common bus, and the value of storing the energy for later removal can be financially resolved by the transactional system 170. Likewise, the common bus can offer to store energy for a node on a common storage, and again the transactional system 170 can resolve the value of the transaction to the common bus. In either case, each local interface device 70 of a transacting node will receive information regarding when to send and when to receive the stored energy.

Once a node has consummated a transaction with another node, that information is stored in the memory of the nodes of the transaction, and at the agreed upon time, the interface device 70 of the selling node causes the controller thereof to open the connection to the common bus to transmit energy or power thereto, and at the same time, the buying node opens its connection to the common bus and draws in energy or power equal to that of the transaction over the transaction time. The selling node can supply the energy or power from any of its resources, including its storage or generating capacity.

As described, each node has the ability to receive or deliver power and energy to any of the connected distribution systems, provided each connected system has the ability to absorb, store, or generate energy. An interface device 70 can be configured to employ several methodologies for determining how to manage power and energy based on various financial and technical reasons, including the spot market pricing for selling. Also, in determining whether to offer to buy or sell energy over the common bus or into the utility grid, the interface device 70 makes the determination regarding when and how much power and energy to consume or deliver depending on the forecast of the weather, the node's anticipated load based on information including historical data of the node's energy use and the mode set at that node (for example, on vacation). For example, if the node user is on vacation, the need for energy at the node is substantially diminished, and thus the interface operates to maintain little or no stored reserve and attempts to sell as much energy as possible at the greatest net value without filling the storage capacity of the node. Additionally, where peak power pricing and charging is in effect, the interface device 70 is configurable to use predictive data, based on past use and timing of peak use, to store energy for use during those periods to shave the peak to reduce or eliminate any peak pricing impact on energy or power drawn from the grid.

With the interface device 70 having the information of near term energy or power use, sale, or draw from one of the common bus or the grid, the interface device 70 uses the bus voltage band control over the local bus of that node (for the DC distribution connection without an active DC/DC between the node and the DC distribution) and adjusts the band up or down to allow the absorption of power or energy thereinto by lowering the voltage band values or delivery of power or energy therefrom by raising the voltage band values. With this the interface device 70 controls the dispatch or absorption of energy or power with respect to the actual distribution voltage level with only the min/max of the DC distribution voltage being maintained by the node. By doing this, the interface also monitors the revenue meter between the local bus thereof and the common bus and can close the loop in real time as the DC distribution DC voltage level changes to equalize the voltages on the local bus to that of the common bus 20. Through this closed loop, the node can control power flow direction and magnitude by adjusting the bus bands in the node's matrix.

For the case in which an active DC/DC device is put in place for purposes of a different voltage level or for more refinement and control of the pass through, the interface device 70 provides the power command to push power in either direction while using the min/max limits in the auto synch DC bus approach as the limits. This provides controllable isolation between systems that can be connected in one node as well as accommodating other DC voltage levels discussed above. The matrix modularity in conjunction with DC bus voltage control, metering feedback, and the interface device 70 allows all combinations to be realized.

In another aspect, the regulator 74 does not need to employ an isolating switch to electrically isolate the local bus from the common bus. Instead, the transfer of energy or power into or from each node is controlled solely by the interface device 70 adjusting the voltage bands on the local bus with respect to the voltage of the common bus. In one configuration, the DC buses of the individual systems are connected directly to the DC distribution system. In this configuration the power and energy will transfer to/from the DC distribution system based on each of the voltage band set points and actual voltages on each of the buses. On the local bus, the interface adjusts these bands to control the absorption or dispatch of power and energy to the common bus. The power and energy flow from each local bus 44 to the common bus 20 will be measured by the meter adjacent to the node. The voltage band set points can be static and set by a node operator, such as owner or user, or the voltage bands can be adjusted automatically based on meter feedback to the interface device 70 based on transactions executed by the interface device 70. Again, as previously described, the buying and selling of energy or power can be manually set by the node user or owner or can be based on execution of the interface device 70 using a pre-determined set of rules for determining whether to buy or sell power and energy.

Where the buying or selling, or not buying or not selling, determination is being made by the interface device 70, the interface device 70 considers one or more of the following classes of information: 1) The state of charge of the system; 2) The magnitude of the power generation in the system; 3) The magnitude of the power consumption/generation in the system on the AC side; 4) The forecast for energy and power use and generation of the system and a determination of a surplus or shortage based on consumption of the loads and the generation of energy or power in the system; 5) The kw rate in which the node owner or user prefers to deliver or absorb power, if set; 6) The kwh level at which the node owner or user prefers to deliver or absorb energy, if set; 7) Any other owner- or user-set method including allowing selected generating sources to the local DC bus (PV, AC, etc.) to deliver at a given level; and 8) The cost of energy available over the utility grid and the common bus, both currently and in the predictable future.

Additionally, the interface device 70 can be set to transact business with nodes based on different priorities. For example, a node can select a negotiated price on a community-based system such as the transactional system 170. A node interface device 70 can select buying from another node based on the lowest cost, or from a specific node. Additionally, in the case of ties such as two nodes offering the same price or value to buy or sell, priority can be given to the first offer in the system by time of entry, or the transactional system 170 can select randomly or by another non-random method, for example selectively prioritizing different nodes in a sequence of nodes.

Where energy or power supply is greater than demand, the transactional system 170 operates with no limit on an amount purchased by a node. If demand is greater than supply, each node on the common bus 20 is required to supply energy or power to maintain bus stability. The common bus 20 can also draw on its own community generating or storage to maintain voltage band stability and the total power consumed. Doing so results in operating system cost to each site on the common bus 20, on either a per stirpes or a pro rata basis based on traditional use of the common bus 20. Alternatively, the cost to maintain stability can be billed to the users of power or energy off of the common bus 20 at the time a stability event occurs.

Figure 7:
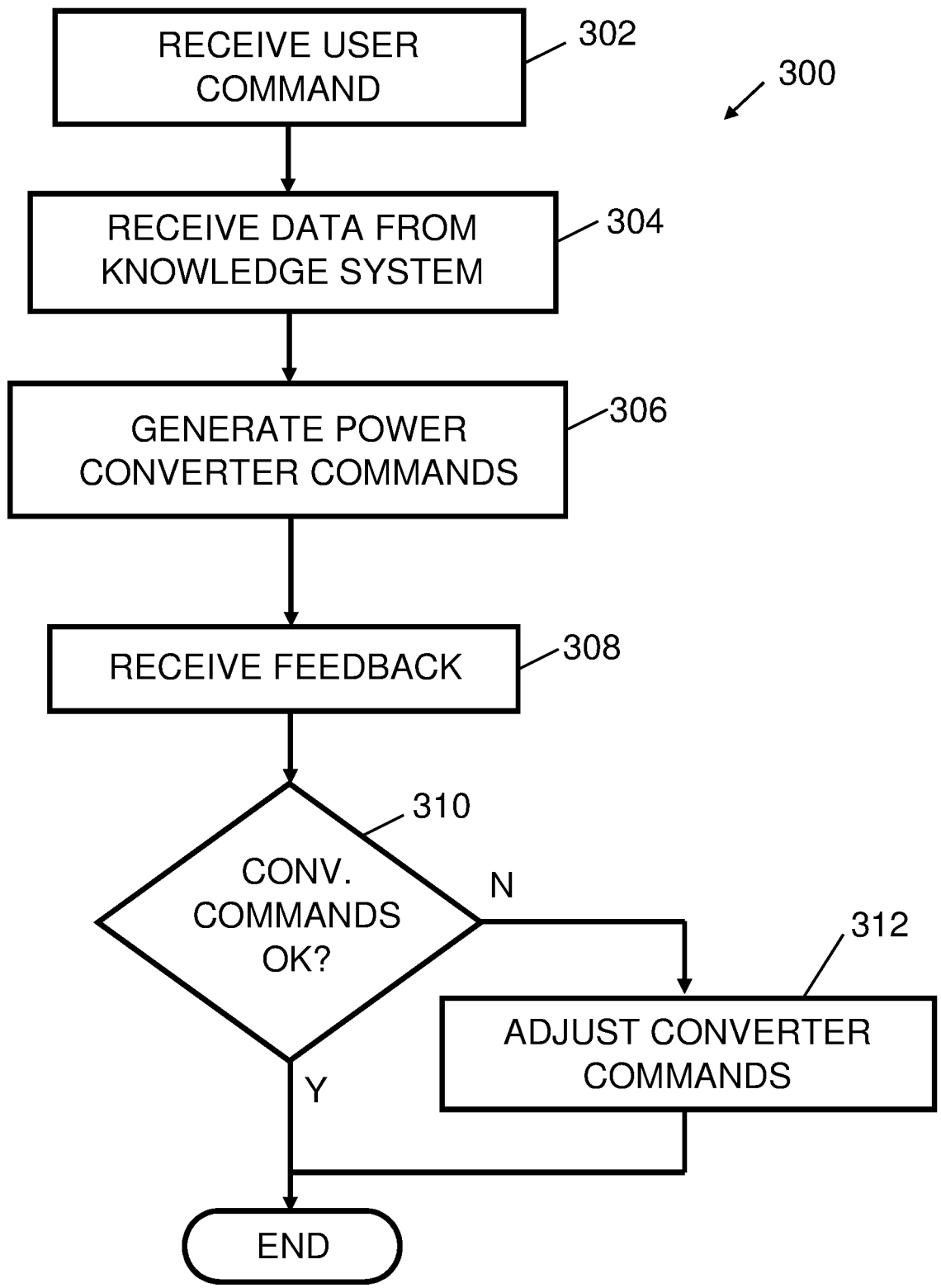
FIG. 7 is a flow diagram illustrating steps for generating power converter commands according to one aspect of the disclosure.

Turning next to FIG. 7, a flow diagram 300 illustrates steps performed by the controller to generate control commands for each of the interface devices 70 within the peer-to-peer distribution system 10 in at least one node connected to the common bus 20. At step 302, the controller receives an initial user command. The user command can be entered directly at the controller via its user interface or can be communicated to the controller via the communication interface. The user command can be stored in memory or in storage for future access. The user command can be, for example, a schedule with multiple commands assigned to different times for execution and the schedule can be stored in a data table. The controller either receives the user command directly or retrieves a stored user command.

At step 304, the controller receives data from one or more knowledge systems connected to the peer-to-peer distribution system 10 and information concerning offers for sale of energy or power on the common bus 20, as well as offers to purchase energy or power on the common bus 20. As discussed above, the knowledge systems can include data corresponding to a past or future operating state of the peer-topeer distribution system 10. The data can correspond to logged data during operation or predicted data that will impact operation of the peer-to-peer distribution system 10. After receiving the user command and data from one or more knowledge systems, the controller will use the user command and the received data to generate control commands to each of the interface devices 70 within the peer-to-peer distribution system 10, as shown in step 306. The control commands set a desired operating point for each interface device 70. The desired control command can be, for example, a kw or a kvar command. The kw command defines a desired amount of real power to be transferred through an interface device 70, for example, an amount of power to be received by the local bus 44 from the common bus 20. The kvar command defines a desired amount of reactive power provided to an AC load or drawn from an AC generating source. Optionally, the control command can be a desired voltage range within which an interface device 70 is idle and outside of which the interface device 70 either transfers power to or draws power from the local bus 44. According to still another aspect, the control command can be a desired voltage or current to be present at either the input 80 or the output 88 of one of the interface devices 70. Steps 308 to 314 represent a feedback and correction loop.

Figure 8:
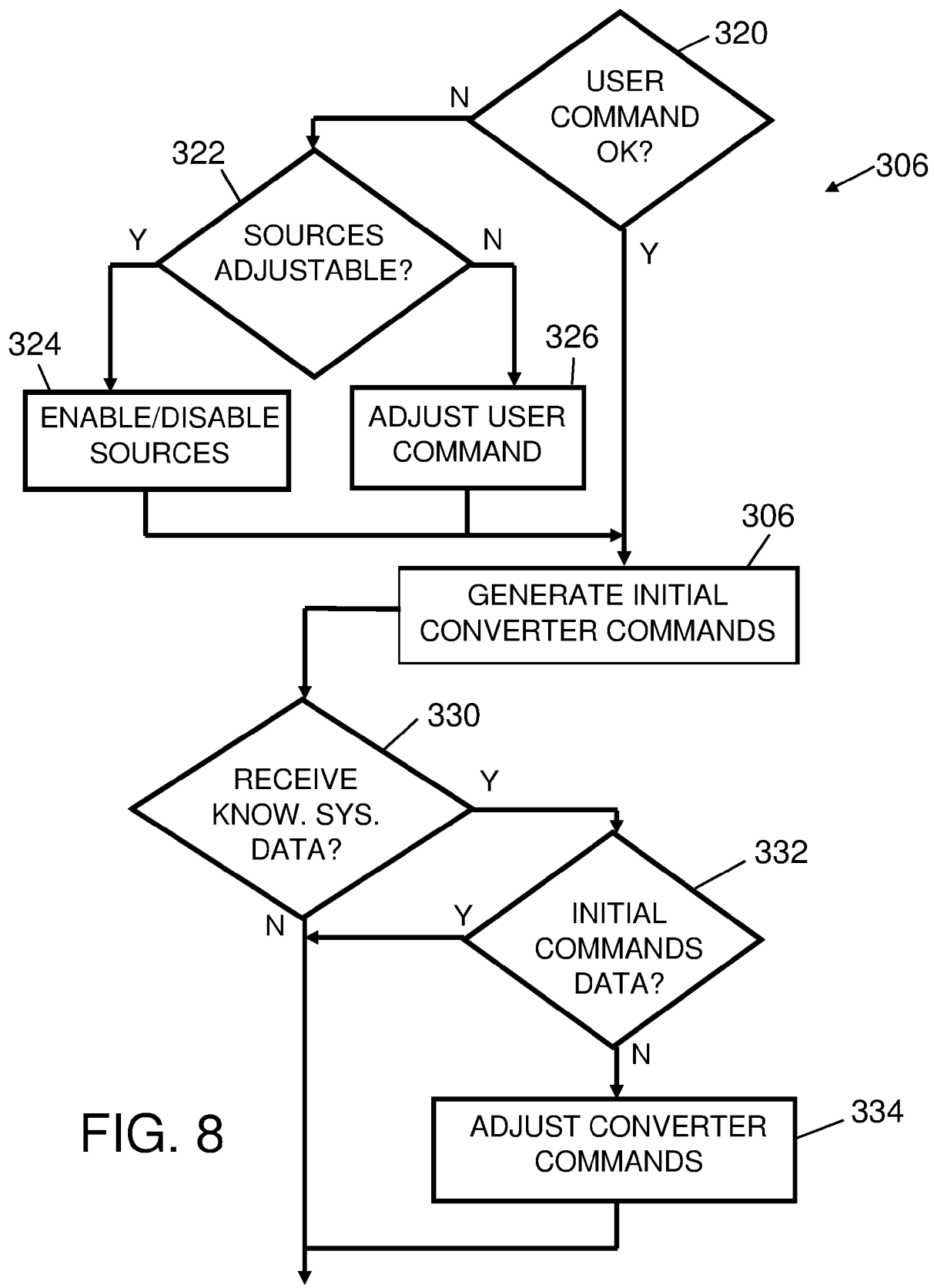
FIG. 8 is a flow diagram illustrating additional steps for generating power converter commands from FIG. 7.

Referring to FIG. 8, additional steps for generating control commands 306 to each of the interface devices 70 are illustrated. At step 320, the controller verifies whether the user command can be executed. The user command can, for example, specify a desired amount of power to be supplied by the generating sources. Each generating source has a maximum power level it is capable of outputting, and the controller can verify that the combined output of the generating sources is able to satisfy the demanded power level. If, for example, one of the generating sources is removed from service for maintenance, the total capacity of the generating sources can be less than the demand. Optionally, the power system can include a number of sources that are selectively enabled and disabled. If the demand is greater than the supply, the controller can determine whether additional sources are available to be enabled, as shown in step 322. If additional sources are available, for example power is available over the common bus 20, the controller enables delivery of the energy or power of the additional sources to the local bus 44, as shown in step 324. Likewise, if an interface device 70 has a scheduled event to receive power, the controller enables delivery of the energy or power of the additional sources to the local bus 44, as shown in step 324. If either the sources are not available to be enabled or the demand exceeds the system capacity or the system capacity and any energy available from the common bus 20 or the utility grid, the controller can adjust the user command as shown in step 326. Similarly, if the user demand is significantly less than the system capacity, the controller can be configured to disable one or more sources, as shown at step 324, such that the sources that are generating power can operate at a more efficient operating point.

After verifying that the system is able to satisfy the user demand, the controller generates control commands for each of the interface devices 70 as shown in step 328. The controller can be configured to use different methods for generating the control commands without deviating from the scope of the disclosure. For example, the controller can divide the user demand evenly among each of the generating sources to supply a desired amount of power. Optionally, the controller can generate control commands proportional to the capacity of each generating source to supply the desired amount of power. In some instances, the user command can define a desired source or that energy be provided from an energy storage device according to a time of day. The controller generates an initial set of control commands for each of the converter 72, inverter 76, and regulator 74 accordingly.

At step 330, the controller determines whether a knowledge system is connected to the peer-to-peer distribution system 10 and whether the knowledge system has provided data as an input to the controller. If no knowledge system is connected or if the knowledge system has not provided data to the controller, the initial set of control commands for each of the interface devices 70 remains unchanged and are transmitted to the corresponding converter 72, inverter 76, and regulator 74. If, however, one or more knowledge systems are connected to the peer-to-peer distribution system 10 and have provided data to the controller, the controller uses the data to verify whether the initial set of control commands are acceptable, as shown in step 332.

Verification of the initial set of control commands is dependent on the type of data provided to the controller. As discussed above, the knowledge system can provide data corresponding to weather, energy supply or demand, energy costs, or usage. The data can be a past operating state including, for example, logged weather conditions, such as temperature, wind speeds, insolation, and the like, or historical trends in energy supply or demand. The data can also be a future operating state including, for example, a weather forecast for the current day or over an extended period of time such as a week or month. The future operating state can be a predicted supply of energy based, for example, on capacity and maintenance schedules for energy generating sources. If, for example, a system includes both a photovoltaic source and a wind turbine, the controller can use a weather forecast as a future operating state. When the weather forecast indicates sunny and calm weather, the controller increases the control command for the photovoltaic source and reduces the control command for the wind turbine. When the weather forecast indicates overcast and windy weather, the controller increases the control command for the wind turbine and reduces the control command for the photovoltaic source. The exemplary weather service can be configured as a knowledge system to transmit future operating states with data values for each weather condition forecast. A range of data values, for example, from a normalized one to one hundred can indicate a range of insolation from fully cloudy to fully sunny. Similarly, a forecast wind speed can be transmitted directly as a data value. Each knowledge system is configured to transmit data to the controller in a predefined format such that the data received at the controller can be used to adjust the initial converter commands as necessary, as shown in step 334. Further detail can be found in U.S. Pat. Publication No. 2017/0358929, which is incorporated herein by reference to the extent it does not conflict herewith.

Turning again to FIG. 7, the controller also receives feedback corresponding to the present operating state of the peer-to-peer distribution system 10, as shown in step 308. As discussed above, the feedback can be transmitted via the network from each of the interface devices 70; received directly via sensors distributed throughout the peer-to-peer distribution system 10, or a combination thereof. At step 310, the controller can evaluate the current operating status of the peer-to-peer distribution system 10 and determine whether the control commands for each of the interface devices 70 are still appropriate to achieve the desired user demand. The controller can monitor, for example, whether the utility grid, the common bus 20, or both are operational and/or whether the peer-to-peer distribution system 10 is operating in a grid-tied or in a grid-independent operation mode. If the utility grid fails, an increased demand can be required from the other generating sources, from the energy storage devices, or from the common bus 20. However, if the grid is not capable of supplying power, the common bus 20 will likely have limited immediate capacity for exchange. If the grid resumes operation after interruption, the control commands to alternative sources and/or control commands to energy storage devices can be reduced or, for energy storage devices, the control command can cause the energy storage device to draw from rather than supply power to the local bus 44. Changes to the converter commands are performed based on the feedback from the peer-to-peer distribution system 10 as illustrated in step 312.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. A peer-to-peer energy sharing network comprising:
a common bus;
a first node including a first local bus, a first electric meter electrically connected between the first local bus and the common bus, at least one of a first load, a first storage device, and a first generating capacity electrically connected to the first local bus through a first interface device, and a first local controller in communication with the first interface device and the first electric meter;
a second node including a second local bus, a second electric meter electrically connected between the second local bus and the common bus, at least one of a second load, a second storage device, and a second generating capacity electrically connected to the second local bus through a second interface device, and a second local controller in communication with the second interface device and the second electric meter; and
a third node including a third local bus, a third electric meter electrically connected between the third local bus and the common bus, at least one of a third load, a third storage device, and a third generating capacity electrically connected to the third local bus through a third interface device, and a third local controller in communication with the third interface device and the third electric meter, wherein:
the first controller is configured to negotiate with the second controller to set at least one pricing point for the first controller and for the second controller;
the first controller and second controller negotiate with each other to set the at least one pricing point for the first controller and for the second controller without data from the third node;
the first interface device is controlled by the first local controller to selectively pass electrical energy to and/or from the common bus via the first local bus as a function of the at least one pricing point for the first controller,
the second interface device is controlled by the second local controller to selectively pass electrical energy to and/or from the common bus via the second local bus as a function of the at least one pricing point for the second controller,
the first electric meter is configured to measure electrical energy passed between the common bus and the first local bus over a predesignated time period, and
the second electric meter is configured to measure electrical energy passed between the common bus and the second local bus over a predesignated time period.

2. The energy sharing network of claim 1, wherein:
the first local controller is in communication with the second local controller,
the first and second local controllers negotiate the at least one pricing point for each of the first and second controllers, and
the first and second local controllers control the first and second interface devices, respectively, based on energy needs and on the at least one pricing point for each of the first and second controllers as negotiated by the first and second controllers.

3. The energy sharing network of claim 1, wherein each interface device is one of a converter, a regulator, and an inverter.

4. The energy sharing network of claim 1, further comprising a utility grid connected to at least one of the common bus, the first local bus, and the second local bus, wherein each connection to the utility grid is through an interface device and a point of charge electric meter.

5. The energy sharing network of claim 1, further comprising a community storage device or a community generating capacity connected to the common bus and electrically connectable to any local bus solely through the common bus.

6. The energy sharing network of claim 1, wherein the first generating capacity and the second generating capacity are each selected from a wind, photovoltaic, hydroelectric, fuel cell, tidal, biofuel, or biomass generating source.

7. The energy sharing network of claim 1, wherein the first storage device and the second storage device are each selected from a battery, a fuel cell, or a flow battery.

8. The energy sharing network of claim 1, wherein the third local controller is in communication with the first local controller.

9. The energy sharing network of claim 1, further comprising a high-level controller in communication with the first and second local controllers.

10. The energy sharing network of claim 1, wherein the first local bus is a DC bus, and wherein the first local controller is configured to set a voltage band within which the first interface device is operable.

11. The energy sharing network of claim 10, wherein the first controller is configured to compare the power and/or energy measured by the first electric meter with the energy needs negotiated by the first and second controllers to set the voltage band for the first interface device.

12. The energy sharing network of claim 10, wherein each local controller is configured to adjust the voltage band of the interface devices operatively connected to the associated local DC bus to transfer electrical energy to or from the common bus via the associated local DC bus.

13. The energy sharing network of claim 1, wherein the common bus is an AC bus.

14. The energy sharing network of claim 1, wherein the first local bus is an AC bus and the second local bus is a DC bus.

15. A peer-to-peer energy sharing network comprising:
a common bus;
a first node including:
a first local bus electrically connected to the common bus, at least one of a first load, a first storage device, and a first generating capacity electrically connected to the first local bus through a first interface device, a first local controller in communication with the first interface device, and a first electric meter interposed in electrical series between the first local bus and the common bus and in communication with the first local controller;

a second node including:

a second local bus electrically connected to the common bus, at least one of a second load, a second storage device, and a second generating capacity electrically connected to the second local bus through a second interface device, a second local controller in communication with the second interface device, and a second electric meter interposed in electrical series between the second local bus and the common bus and in communication with the second local controller; and a third node including:

a third local bus electrically connected to the common bus, at least one of a third load, a third storage device, and a third generating capacity electrically connected to the third local bus through a third interface device, a third local controller in communication with the third interface device, and a third electric meter interposed in electrical series between the third local bus and the common bus and in communication with the third local controller, wherein:

the first local controller is in communication with the second local controller, the first controller and the second controller are configured to negotiate with each other without data from the third controller to set at least one pricing point for the first controller and to set at least one pricing point for the second controller;

the first interface device is controlled by the first local controller to selectively pass electrical energy to and/or from the common bus via the first local bus and the second interface device is controlled by the second local controller to selectively pass electrical energy to and/or from the common bus via the second local bus based on energy needs and based on the at least one pricing point negotiated by the first and second controllers, and the first controller is configured to compare power and/or energy registered by the first electric meter with the energy needs to set operating conditions for the first interface device.

16. The energy sharing network of claim 15, wherein each interface device is one of a converter, a regulator, and an inverter.

17. The energy sharing network of claim 15, further comprising:

a fourth load, fourth storage device, or fourth generating capacity electrically connected to the first local bus through a fourth interface device, the first local controller in communication with the fourth interface device; and a fifth load, fifth storage device, or fifth generating capacity electrically connected to the second local bus through a fifth interface device, the second local controller in communication with the fifth interface device, wherein the fourth interface device is controlled by the first local controller to selectively pass electrical energy to and/or from the common bus via the first local bus and the fifth interface device is controlled by the second local controller to selectively pass electrical energy to and/or from the common bus via the second local bus based on energy needs negotiated by the first and second controllers, and wherein the first controller is configured to compare power and/or energy registered by the first electric meter with the energy needs to set operating conditions for the first and fourth interface devices.

18. A peer-to-peer energy sharing network comprising:

a common bus;

a first node including a first local bus, a first electric meter electrically connected between the first local bus and the common bus, at least one of a first load, a first storage device, and a first generating capacity electrically connected to the first local bus through a first interface device, and a first local controller in communication with the first interface device;

a second node including a second local bus, a second electric meter electrically connected between the second local bus and the common bus, at least one of a second load, a second storage device, and a second generating capacity electrically connected to the second local bus through a second interface device, and a second local controller in communication with the second interface device;

a third node including a third local bus, a third electric meter electrically connected between the third local bus and the common bus, at least one of a third load, a third storage device, and a third generating capacity electrically connected to the third local bus through a third interface device, and a third local controller in communication with the third interface device;

at least one knowledge system, wherein each knowledge system stores data corresponding to either historical performance or expected performance of the peer-to-peer energy sharing network; and a fourth controller in communication with each of the first, second, and third local controllers, wherein:

the first electric meter is configured to measure electrical energy passed between the common bus and the first local bus over a predesignated time period, the second electric meter is configured to measure electrical energy passed between the common bus and the first local bus over the predesignated time period, the third electric meter is configured to measure electrical energy passed between the common bus and the third local bus over the predesignated time period, the first local controller is configured to:

obtain data corresponding to either historical performance or expected performance of the peer-to-peer energy sharing network from the at least one knowledge system, communicate with the second local controller to negotiate the amount and cost of power and energy each local node commits to transferring to or from the common bus as a function of the data obtained from the at least one knowledge system, set at least one pricing point for the first local controller as a result of the negotiation with the second local controller without receiving data from the third local controller; and communicate with the first electric meter to obtain a value of the measured electrical energy passed between the common bus and the first local bus, the second local controller is configured to:

set at least one pricing point for the second local controller as a result of the negotiation with the first local controller without receiving data from the third local controller, and communicate with the second electric meter to obtain a value of the measured electrical energy passed between the common bus and the second local bus, the first interface device is controlled by the first local controller to selectively pass electrical energy to and/or from the common bus via the first electric meter and the first local bus based on the amount of energy committed, the second interface device is controlled by the second local controller to selectively pass electrical energy to and/or from the common bus via the second electric meter and the second local bus based on the amount of energy committed, and the first and the second local controllers transmit the value of the measured electrical energy passed between the common bus and the first and second local buses, respectively, to the fourth controller, and the fourth controller is configured to determine a cost due to or from the first node and the second node as a function of the at least one pricing point set by each of the first and second local controllers and of the measured electrical energy passed between the common bus and each of the first and second local buses.

19. The energy sharing network of claim 18, further comprising a community node electrically connected to the common bus, wherein:

the community node includes a fourth local bus, a fourth electric meter electrically connected between the fourth local bus and the common bus, at least one of a fourth load, a fourth storage device, and a fourth generating capacity electrically connected to the fourth local bus through a fourth interface device, and a fourth local controller in communication with the fourth interface device, the fourth electric meter is configured to measure electrical energy passed between the common bus and the fourth local bus over the predesignated time period, the fourth local controller transmits a value of measured electrical energy passed between the common bus and the fourth local bus, and the cost due to or from the first node and the second node is further determined as a function of the measured energy passed between the common bus and the fourth local bus.

20. The energy sharing network of claim 1, wherein:

the first controller is configured to set a first pricing point corresponding to the receipt of electrical energy at the first local bus from the common bus and to set a second pricing point corresponding to the transmission of electrical energy from the first local bus to the common bus; and the second controller is configured to set a third pricing point corresponding to the receipt of electrical energy at the second local bus from the common bus and to set a fourth pricing point corresponding to the transmission of electrical energy from the second local bus to the common bus.

* * * * *